United States Patent
Allard et al.

(10) Patent No.: US 8,944,541 B2
(45) Date of Patent: Feb. 3, 2015

(54) VACUUM PANEL CABINET STRUCTURE FOR A REFRIGERATOR

(71) Applicant: Whirlpool Corporation, Benton Harbor, MI (US)

(72) Inventors: Paul B. Allard, Stevensville, MI (US); Nihat Cur, Saint Joseph, MI (US); Luiz Afrânio Alves Ferreira, Joinville (BR); James W. Kendall, Mount Prospect, IL (US); Steven J. Kuehl, Stevensville, MI (US); Axel J. Ramm, Saint Joseph, MI (US); Guolian Wu, Saint Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 119 days.

(21) Appl. No.: 13/835,449

(22) Filed: Mar. 15, 2013

(65) Prior Publication Data
US 2013/0257256 A1 Oct. 3, 2013

Related U.S. Application Data

(60) Provisional application No. 61/618,914, filed on Apr. 2, 2012.

(51) Int. Cl.
| A47B 96/04 | (2006.01) |
| H04R 3/12 | (2006.01) |
| F25B 39/00 | (2006.01) |
| F25D 11/00 | (2006.01) |
| F25D 23/02 | (2006.01) |

(Continued)

(52) U.S. Cl.
CPC *H04R 3/12* (2013.01); *F25B 39/00* (2013.01); *F25D 11/00* (2013.01); *F25D 23/028* (2013.01); *F25D 23/063* (2013.01); *F25D 23/062* (2013.01); *F25D 23/065* (2013.01); *B29C 53/00* (2013.01); *F25D 2201/14* (2013.01)
USPC .......................................................... 312/406

(58) Field of Classification Search
USPC ............... 312/116, 400, 401, 406, 406.1–407
See application file for complete search history.

(56) References Cited

U.S. PATENT DOCUMENTS

| 2,108,212 A | 2/1938 | Schellens |
| 3,125,388 A * | 3/1964 | Costantini ..................... 312/400 |

(Continued)

FOREIGN PATENT DOCUMENTS

| CA | 1320631 | 7/1993 |
| CA | 2259665 | 1/1998 |

(Continued)

*Primary Examiner* — Matthew Ing

(57) ABSTRACT

A vacuum panel cabinet structure comprising a frame having side and back framing members defining a frame opening and panel receptacles, framing edges, at least one outwardly expanded framing member, and an inner surface. A plurality of vacuum panels disposed in the panel receptacles. A barrier layer disposed on the vacuum panels. An outer enclosure having at least one extruded channel engaging the at least one outwardly expanded framing member, at least one outwardly contoured hinge, and an inward surface defining a frame receptacle into which the frame is disposed. A liner having at least four sidewalls, a back panel, a liner outer facing surface, and a liner perimetrical flange, wherein the liner outer facing surface is disposed within the frame opening proximate the frame inner surface. The liner perimetrical flange is disposed to the outer enclosure and includes a hermetically sealed infrastructure notch.

19 Claims, 14 Drawing Sheets

(51) Int. Cl.
*F25D 23/06* (2006.01)
*B29C 53/00* (2006.01)

(56) References Cited

U.S. PATENT DOCUMENTS

| | | | |
|---|---|---|---|
| 3,137,900 A | 6/1964 | Carbary | |
| 3,379,481 A * | 4/1968 | Fisher | 312/100 |
| 3,688,384 A * | 9/1972 | Mizushima et al. | 29/455.1 |
| 4,006,947 A * | 2/1977 | Haag et al. | 312/406 |
| 4,660,271 A | 4/1987 | Lenhardt | |
| 4,671,985 A | 6/1987 | Rodrigues et al. | |
| 4,917,841 A | 4/1990 | Jenkins | |
| 5,007,226 A | 4/1991 | Nelson | |
| 5,033,636 A | 7/1991 | Jenkins | |
| 5,082,335 A | 1/1992 | Cur et al. | |
| 5,221,136 A | 6/1993 | Hauck et al. | |
| 5,248,196 A | 9/1993 | Lynn et al. | |
| 5,252,408 A | 10/1993 | Bridges et al. | |
| 5,263,773 A | 11/1993 | Gable et al. | |
| 5,359,795 A | 11/1994 | Mawby et al. | |
| 5,512,345 A | 4/1996 | Tsutsumi et al. | |
| 5,632,543 A | 5/1997 | McGrath et al. | |
| 5,652,039 A | 7/1997 | Tremain et al. | |
| 5,985,189 A | 11/1999 | Lynn et al. | |
| 6,109,712 A | 8/2000 | Haworth et al. | |
| 6,128,914 A | 10/2000 | Tamaoki et al. | |
| 6,164,030 A | 12/2000 | Dietrich | |
| 6,224,179 B1 | 5/2001 | Wenning et al. | |
| 6,260,377 B1 | 7/2001 | Tamaoki et al. | |
| 6,408,841 B1 | 6/2002 | Hirath et al. | |
| 6,415,623 B1 * | 7/2002 | Jennings et al. | 62/457.2 |
| 6,460,955 B1 * | 10/2002 | Vaughan et al. | 312/401 |
| 6,773,082 B2 * | 8/2004 | Lee | 312/401 |
| 7,210,308 B2 | 5/2007 | Tanimoto et al. | |
| 7,296,432 B2 | 11/2007 | Muller et al. | |
| 7,316,125 B2 | 1/2008 | Uekado et al. | |
| 7,641,298 B2 | 1/2010 | Hirath et al. | |
| 7,815,269 B2 | 10/2010 | Wenning et al. | |
| 7,886,559 B2 | 2/2011 | Hell et al. | |
| 7,930,892 B1 | 4/2011 | Vonderhaar | |
| 8,113,604 B2 * | 2/2012 | Olson et al. | 312/236 |
| 8,117,865 B2 | 2/2012 | Allard et al. | |
| 8,353,177 B2 | 1/2013 | Adamski et al. | |
| 2004/0178707 A1 * | 9/2004 | Avendano et al. | 312/401 |
| 2006/0201189 A1 | 9/2006 | Adamski et al. | |
| 2007/0001563 A1 | 1/2007 | Park et al. | |
| 2007/0099502 A1 | 5/2007 | Ferinauer et al. | |
| 2009/0056367 A1 | 3/2009 | Neumann | |
| 2009/0058244 A1 | 3/2009 | Cho et al. | |
| 2009/0113925 A1 | 5/2009 | Korkmaz | |
| 2009/0179541 A1 | 7/2009 | Smith et al. | |
| 2010/0293984 A1 | 11/2010 | Adamski et al. | |
| 2010/0295435 A1 | 11/2010 | Kendall et al. | |
| 2011/0146335 A1 | 6/2011 | Jung et al. | |
| 2011/0260351 A1 | 10/2011 | Corradi et al. | |
| 2011/0290808 A1 | 12/2011 | Bai et al. | |
| 2011/0315693 A1 | 12/2011 | Cur et al. | |
| 2012/0000234 A1 | 1/2012 | Adamski et al. | |
| 2012/0103006 A1 | 5/2012 | Jung et al. | |
| 2012/0104923 A1 | 5/2012 | Jung et al. | |
| 2012/0118002 A1 | 5/2012 | Kim et al. | |
| 2012/0137501 A1 | 6/2012 | Allard et al. | |
| 2012/0279247 A1 | 11/2012 | Katu et al. | |
| 2012/0297813 A1 | 11/2012 | Hanley et al. | |
| 2012/0324937 A1 | 12/2012 | Adamski et al. | |

FOREIGN PATENT DOCUMENTS

| | | |
|---|---|---|
| CN | 1158509 | 7/2004 |
| CN | 1970185 | 5/2007 |
| CN | 100359272 | 1/2008 |
| CN | 102452522 | 5/2012 |
| DE | 102010024951 | 12/2011 |
| EP | 1200785 | 5/2002 |
| EP | 1505359 | 2/2005 |
| GB | 837929 | 6/1960 |
| GB | 1214548 | 12/1970 |
| JP | 73028353 | 8/1973 |
| JP | 51057777 | 5/1976 |
| JP | 08300052 | 11/1996 |
| JP | 2000117334 | 4/2000 |
| JP | 2001343176 | 12/2001 |
| JP | 0347877 | 12/2003 |
| JP | 2004303695 | 10/2004 |
| JP | 2005164193 | 6/2005 |
| JP | 2009162402 | 7/2009 |
| JP | 2010145002 | 7/2010 |
| JP | 04545126 B2 | 9/2010 |
| JP | 2010236770 | 10/2010 |
| JP | 2010276309 | 12/2010 |
| JP | 2011196644 | 10/2011 |
| JP | 2012087993 | 5/2012 |
| JP | 2012242075 | 12/2012 |
| KR | 20040000126 | 1/2004 |
| WO | WO2010092627 | 8/2010 |
| WO | WO2011003711 | 1/2011 |
| WO | WO2012026715 | 3/2012 |

* cited by examiner

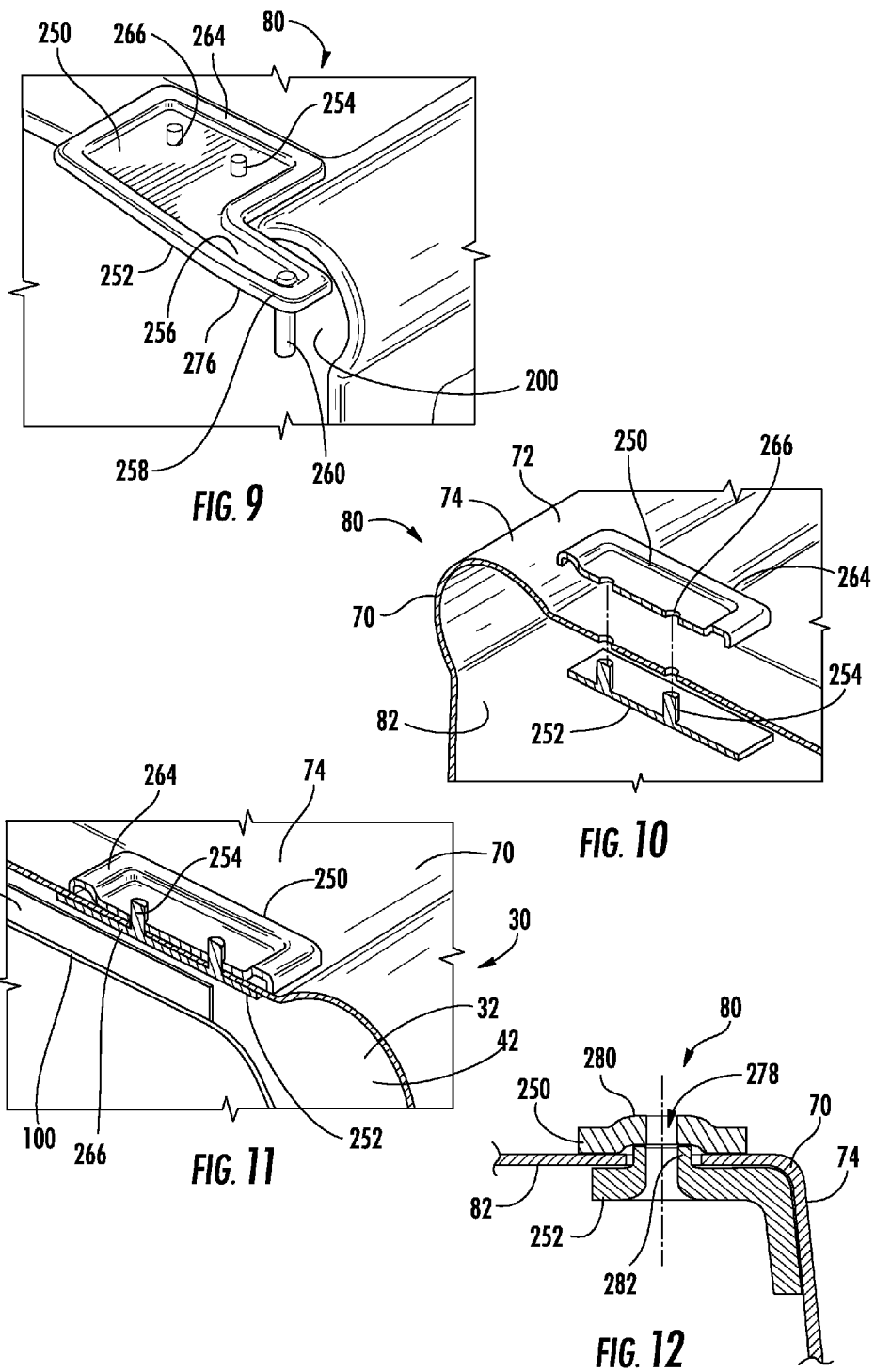

VACUUM PANEL CABINET STRUCTURE FOR A REFRIGERATOR

CLAIM OF PRIORITY

This application claims priority to and the benefit of U.S. Provisional Patent Application Ser. No. 61/618,914, filed on Apr. 2, 2012, entitled ENERGY EFFICIENT HOME APPLIANCES.

CROSS-REFERENCE TO RELATED APPLICATIONS

The present application is related to U.S. patent application Ser. No. 13/833,635 filed Mar. 15, 2013, entitled A METHOD TO CREATE VACUUM INSULATED CABINETS FOR REFRIGERATORS; and U.S. patent application Ser. No. 13/836,669 filed Mar. 15, 2013, entitled FOLDED VACUUM INSULATED STRUCTURE; and U.S. patent application Ser. No. 13/832,246 filed Mar. 15, 2013, entitled DUAL COOLING SYSTEMS TO MINIMIZE OFF-CYCLE MIGRATION LOSS IN REFRIGERATORS WITH A VACUUM INSULATED STRUCTURE; and U.S. patent application Ser. No. 13/833,696 filed Mar. 15, 2013, entitled VACUUM INSULATED DOOR STRUCTURE AND METHOD FOR THE CREATION THEREOF; and U.S. patent application Ser. No. 13/836,143 filed Mar. 15, 2013, entitled VACUUM INSULATED STRUCTURE TUBULAR CABINET CONSTRUCTION; and U.S. patent application Ser. No. 13/837,659 filed Mar. 15, 2013, entitled FOLDED VACUUM INSULATED STRUCTURE; and U.S. patent application Ser. No. 13/833,685 filed Mar. 15, 2013, entitled METHOD TO CREATE VACUUM INSULATED CABINETS FOR REFRIGERATORS, all of which are incorporated herein by reference in their entirety.

FIELD OF THE INVENTION

The invention is in the field of cabinet structures for refrigerators, and more specifically, cabinet structures that incorporate vacuum panels.

SUMMARY

In one aspect, a vacuum panel cabinet structure comprises a polymeric inner frame having at least four side framing members defining an inner frame opening, a plurality of framing edges, a back framing member coupled to at least one of the plurality of framing edges, at least one outwardly expanded framing member disposed proximate at least one of the plurality of framing edges, an inner facing surface, and an outer facing surface. The at least four side frame members and the back framing member define a plurality of panel receptacles. A plurality of vacuum insulated panels sized and configured for reception in the plurality of panel receptacles. A barrier layer comprising a hermetic barrier layer and a heat sealing layer is disposed on at least a portion of the vacuum insulated panels and at least a portion of the polymeric inner frame. An outer enclosure has at least one extruded support channel that is configured to engage the at least one outwardly expanded framing member of the polymeric inner frame. The outward enclosure also has, an outer facing surface, an enclosure rim defining an enclosure opening, a hinge member disposed proximate at least one of the at least one extruded support channel, and an inner facing surface defining a receptacle for receiving the polymeric inner frame, wherein the inner facing surface of the outer enclosure engages at least a portion of the outer facing surface of the polymeric inner frame. A liner has at least four sidewalls defining a liner opening, a back panel, a liner inner facing surface, a liner outer facing surface, and a liner perimetrical flange extending away from the liner opening, wherein the liner outer facing surface is disposed within the inner frame opening of the polymeric inner frame proximate the inner facing surface of the polymeric inner frame, and wherein the liner perimetrical flange is disposed to the outer enclosure proximate the enclosure rim, thereby defining the vacuum panel cabinet structure. At least one infrastructure notch is defined by the cabinet structure proximate the liner perimetrical flange, wherein a filler member hermetically seals the infrastructure notch, and wherein a gasket is selectively disposed on at least a portion of the liner perimetrical flange.

In another aspect, an appliance having a vacuum panel cabinet structure comprises an inner structure having a plurality of polyurethane framing members defining a plurality of panel receptacles and a plurality of vacuum insulated panels disposed within the plurality of panel receptacles, wherein the inner structure includes at least four framing walls defining an inner frame opening, a back framing wall, a plurality of outwardly expanded framing members disposed proximate at least one of the plurality of polyurethane framing members, an inner facing surface, and an outer facing surface, a barrier layer comprising a hermetic barrier layer and a heat sealing layer disposed on at least a portion of the vacuum insulated panels. An outer enclosure has a plurality of extruded support channels configured to receive the plurality of outwardly expanded framing members, an outer facing surface, a hinge member having a body portion and a reinforcing portion, an enclosure rim defining an enclosure opening, and an inner facing surface defining a receptacle for receiving the inner structure, wherein the inner facing surface of the outer enclosure engages at least a portion of the outer facing surface of the inner structure. A liner has at least four sidewalls defining a liner opening, a back panel, a liner inner facing surface, a liner outer facing surface, and a liner perimetrical flange extending away from the liner opening, wherein the liner outer facing surface is disposed within the inner structure opening proximate the inner facing surface of the inner structure, and wherein the liner perimetrical flange is coupled to the enclosure rim, thereby defining a cabinet structure. At least one infrastructure notch is defined by the cabinet structure proximate the liner perimetrical flange, wherein a filler member hermetically seals the infrastructure notch, and wherein a gasket is selectively disposed on at least a portion of the liner perimetrical flange.

In yet another aspect, the invention includes a method for creating a vacuum panel cabinet structure comprising the steps of providing a polymeric inner frame having at least four side framing members defining an inner frame opening, a plurality of framing edges, a back framing member coupled to at least one of the plurality of framing edges, at least one outwardly expanded framing member disposed proximate at least one of the plurality of framing edges, an inner facing surface, and an outer facing surface, wherein the at least four side frame members and the back framing member define a plurality of panel receptacles. Providing a plurality of vacuum insulated panels configured for reception in the plurality of panel receptacles. Disposing the vacuum insulated panels within the plurality of panel receptacles; disposing a barrier layer comprising a hermetic barrier layer and a heat sealing layer on at least a portion of the vacuum insulated panels and at least a portion of the polymeric inner frame. Providing an outer enclosure having an outer facing surface, an enclosure rim defining an enclosure opening, at least one extruded support channel configured to engage the at least one outwardly expanded framing member, and an inner facing surface defining a structure receptacle for receiving the polymeric inner frame. Disposing at least one hinge members onto the outer enclosure, wherein each at least one hinge member includes a hinge body disposed on the outer facing surface of the outer enclosure, a reinforcing portion disposed on the inner facing surface of the outer enclosure, and at least one connection member that couples the inner hinge member to the outer hinge member, wherein the first hinge members is disposed proximate at least one of the at least one outwardly expanded framing member. Disposing the polymeric inner frame into the structure receptacle, wherein the inner facing surface of the outer enclosure engages at least a portion of the outer facing surface of the polymeric inner frame; providing a liner having at least four sidewalls defining a liner opening, a back panel, a liner inner facing surface, a liner outer facing surface, and a liner perimetrical flange extending away from the liner opening. Disposing the liner within the inner structure opening such that the liner outer facing surface is disposed proximate the inner facing surface of the polymeric inner frame. Disposing the liner perimetrical flange of the liner to the enclosure rim of the outer enclosure to define a cabinet structure. Providing at least one infrastructure notch defined by the cabinet structure proximate the liner perimetrical flange, wherein a filler material is disposed within the infrastructure notch to hermetically seal the infrastructure notch; and selectively disposing a gasket on at least a portion of the liner perimetrical flange, wherein the gasket is configured to selectively engage and further seal the infrastructure notch.

These and other features, advantages, and objects of the present device will be further understood and appreciated by those skilled in the art upon studying the following specification, claims, and appended drawings.

BRIEF DESCRIPTION OF THE DRAWINGS

In the drawings:

FIG. 9 is a detail perspective view of one embodiment of the vacuum panel cabinet structure of FIG. 6;

FIG. 10 is a partially exploded detail section view of another embodiment the vacuum panel cabinet structure;

FIG. 11 is a detail section view of the vacuum panel cabinet structure of FIG. 9;

FIG. 12 is a detail section view of another embodiment of the vacuum panel cabinet structure;

DETAILED DESCRIPTION OF EMBODIMENTS

Figure 1:
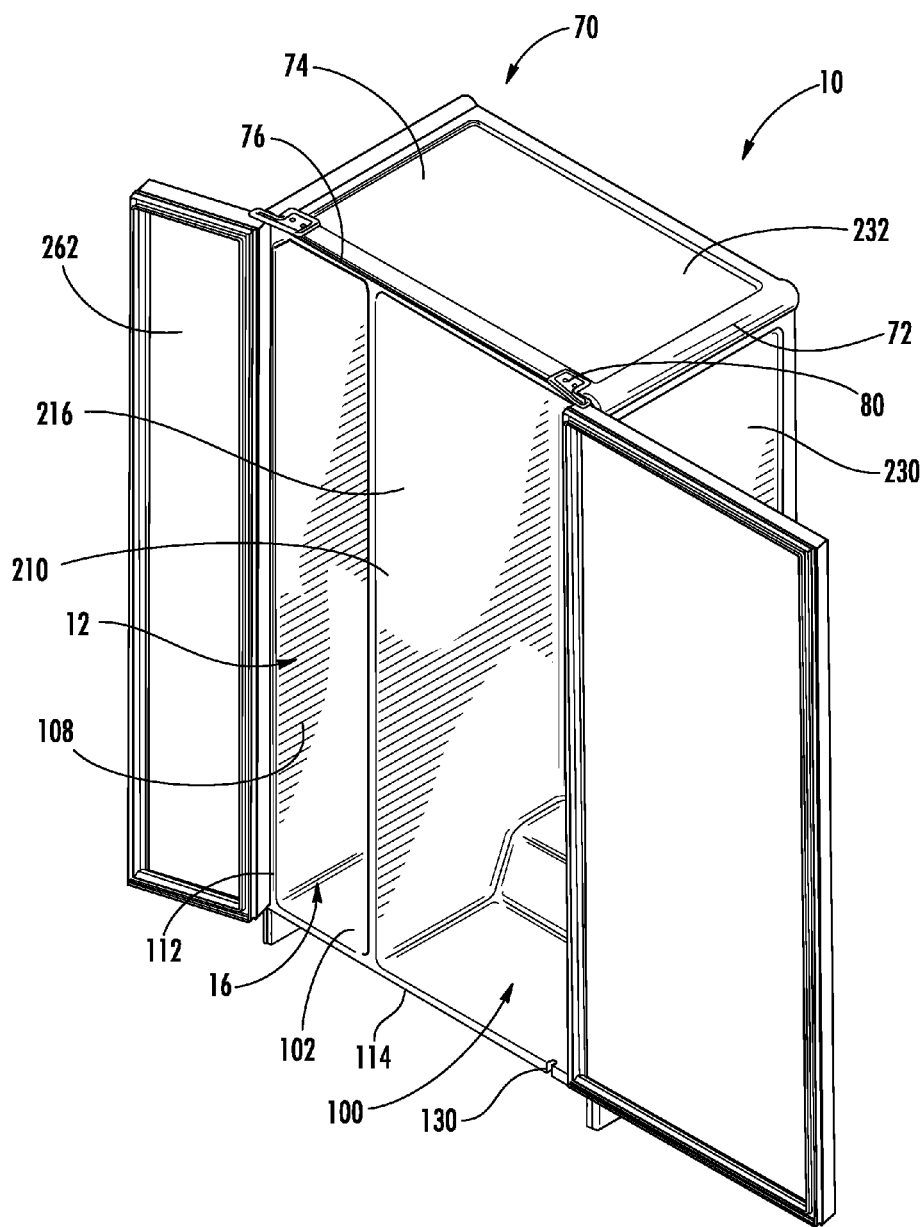
FIG. 1 is a top perspective view of one embodiment of the vacuum panel cabinet structure with the doors in the open position.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
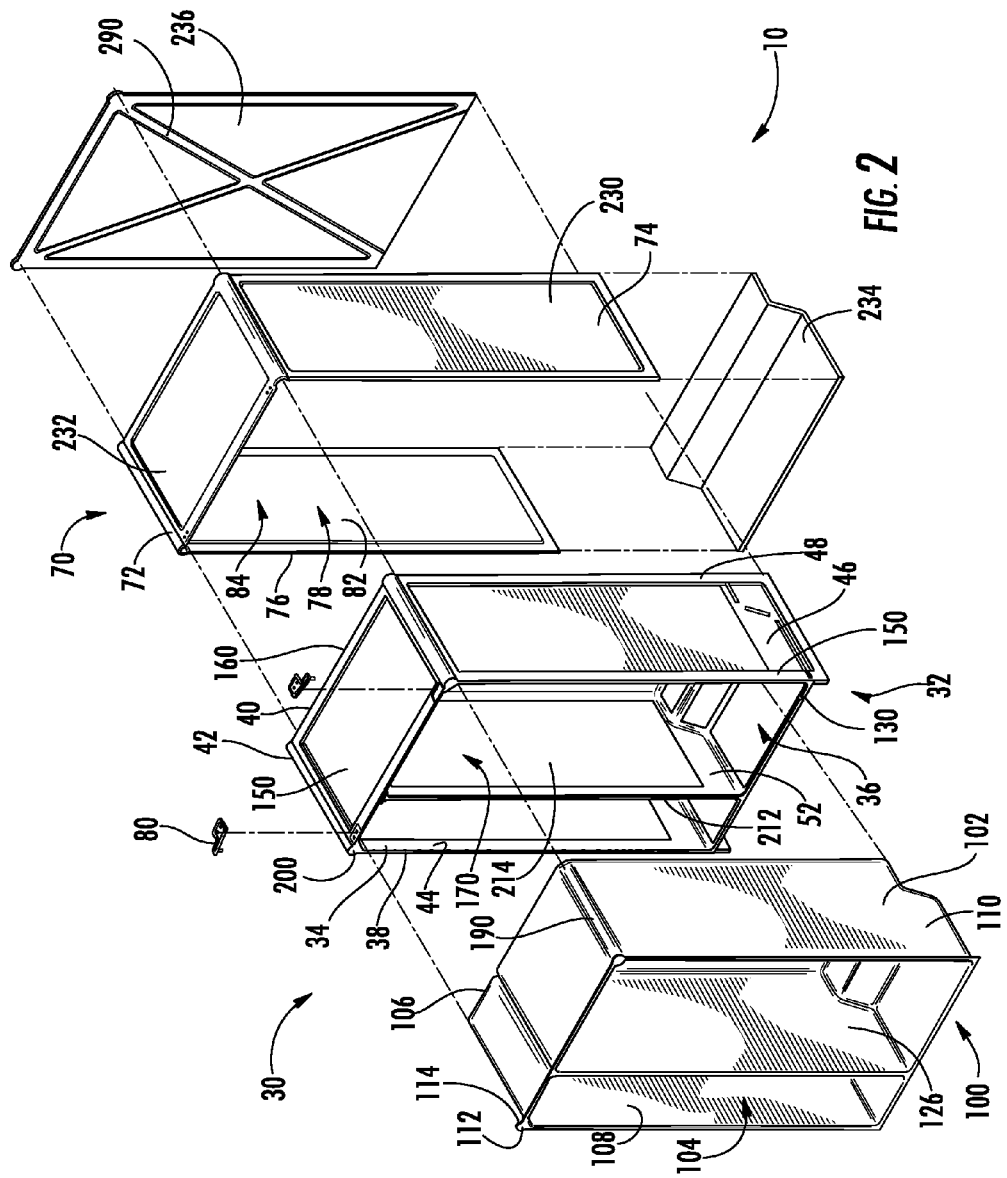
FIG. 2 is a top exploded perspective view of the vacuum panel cabinet structure of FIG. 1.

With respect to FIGS. 1-2, a refrigerator 10 is generally shown. In each of these embodiments, the refrigerator 10 can have an interior 12 and a cooling loop 14 (shown in FIGS. 17-19). At least a portion of the interior 12 can include at least one compartment 16. The cooling loop 14 can include at least one evaporator proximate the at least one compartment 16 where the at least one evaporator provides cooling to the at least one compartment 16 within the interior 12.

Figure 3:
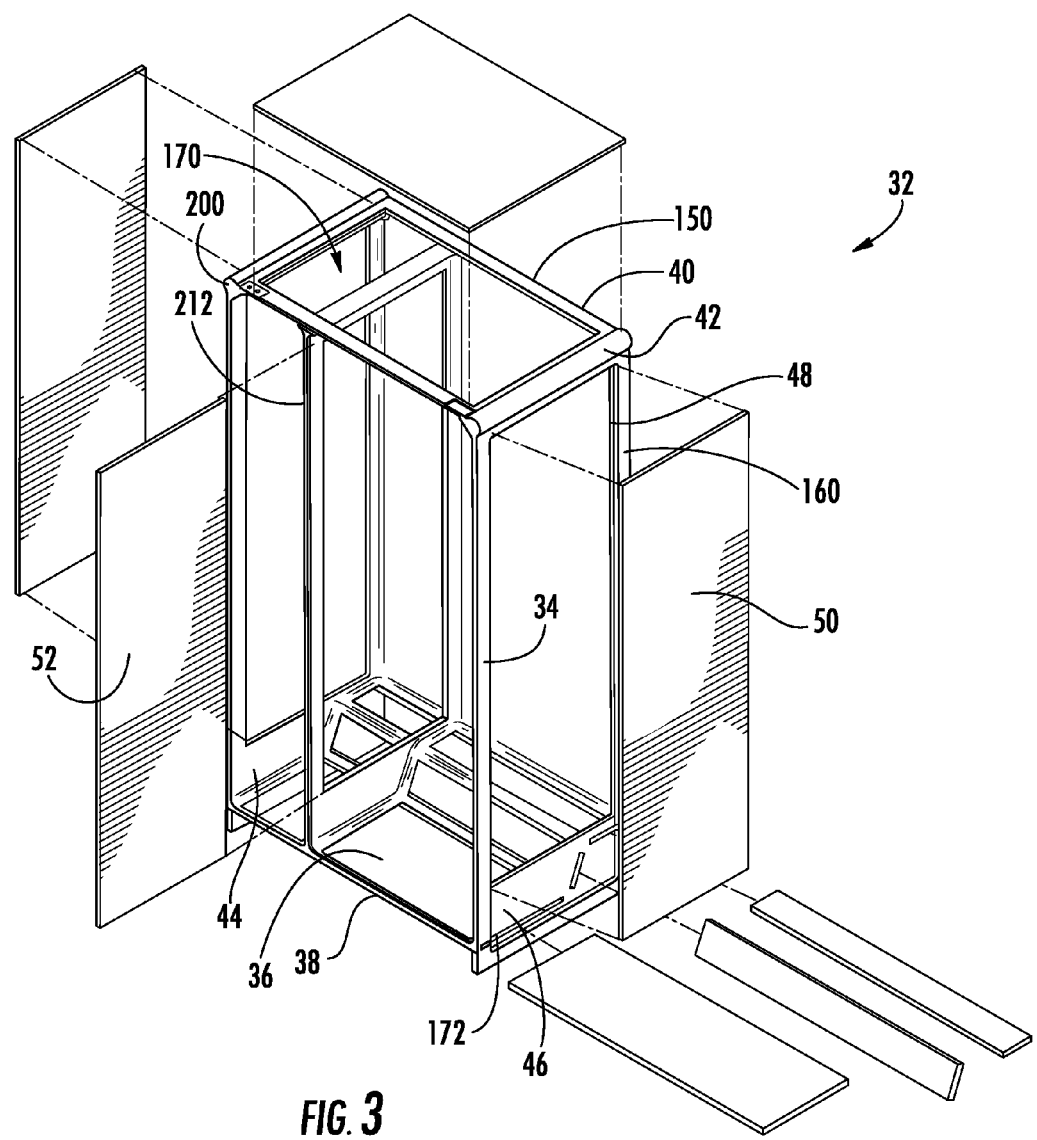
FIG. 3 is a top exploded perspective view of one embodiment of the polymeric inner frame with the vacuum insulated panels removed.

A first aspect, as illustrated in FIGS. 1-3, a vacuum panel cabinet structure 30 includes a polymeric inner frame 32 having at least four side framing members 34 that define an inner frame opening 36. The polymeric inner frame 32 also includes a plurality of framing edges 38, a back framing member 40 coupled to at least one of the plurality of framing edges 38, at least one outwardly expanded framing member 42 disposed proximate at least one of the plurality of framing edges 38, an inner facing surface 44, and an outer facing surface 46. The side framing members 34 and the back framing member 40 each define a plurality of panel receptacles 48. A plurality of vacuum insulated panels 50 are sized and configured for reception in the plurality of panel receptacles 48. A barrier layer 52 comprising a hermetic barrier layer and a heat sealing layer can be disposed on at least a portion of the vacuum insulated panels 50 and at least a portion of the polymeric inner frame 32.

As shown in FIGS. 1-2, the vacuum panel cabinet structure 30 also includes an outer enclosure 70 having at least one extruded support channel 72 that is configured to engage the at least one outwardly expanded framing member 42 of the polymeric inner frame 32. The outer enclosure 70 also includes an outward surface 74, an enclosure rim 76 defining an enclosure opening 78, at least one outwardly contoured hinge 80 disposed proximate the at least one extruded support channel 72 and an inward surface 82 that defines a structure receptacle 84 configured to receive the polymeric inner frame 32. When so received, the inward surface 82 of the outer enclosure 70 engages at least a portion of the outer facing surface 46 of the polymeric inner frame 32.

As shown in FIGS. 1-2, a liner 100 is included that has at least four sidewalls 102 that define a liner opening 104, a liner back panel 106, a liner inner facing surface 108, a liner outer facing surface 110, and a liner perimetrical flange 112 that extends outward and away from the liner opening 104. The liner 100 is configured such that the liner outer facing surface 110 is disposed within the inner frame opening 36 of the polymeric inner frame 32 proximate the inner facing surface 44 of the polymeric inner frame 32. The liner perimetrical flange 112 of the liner 100 includes a perimetrical edge 114 that is disposed to the outer enclosure 70 proximate the enclosure rim 76, thereby encasing the polymeric inner frame 32, the plurality of vacuum insulated panels 50 and the barrier layer 52 within a cavity defined by the inward surface 82 of the outer enclosure 70 and the liner outer facing surface 110, thereby defining the vacuum panel cabinet structure 30.

As shown in FIG. 1, to accommodate the installation of the cooling loop 14 and to provide a path of travel for the cooling loop 14 to provide cooling to the interior 12 of the refrigerator 10, the vacuum panel cabinet structure 30 includes at least one infrastructure notch 130 defined therein and located proximate the liner perimetrical flange 112. As will be discussed more fully below, a filler member 132 and a gasket 134 are disposed on at least a portion of the liner perimetrical flange 112 proximate the infrastructure notch 130 in order to hermetically seal the infrastructure notch 130.

As illustrated in the embodiment of FIGS. 2-3, the polymeric inner frame 32 can include a plurality of framing members 150 that are coupled together to form the polymeric inner frame 32 as well as the plurality of panel receptacles 48. The polymeric inner frame 32 can be made of materials that include, but are not limited, polyurethane or polystyrene. The outwardly expanded frame members can include an arcuate profile that extends the length of a framing edge 38. In this manner, the outwardly expanded framing members 42 increase the structural stability of the polymeric inner frame 32 and the vacuum panel cabinet structure 30 as a whole. Two outwardly expanded framing members 42 are shown, however, additional outwardly expanded framing members can be included in the polymeric inner frame 32 depending upon the design needs of the refrigerator 10.

It should be understood that the cross-sectional shape of the outwardly expanded framing members 42 can vary such that the outwardly expanded framing members 42 can have a different arcuate profile, a polygonal profile or some other irregular profile, so long as the outwardly expanded framing member 42 extends outward from one or more of the framing members 150.

As illustrated in the embodiment of FIGS. 2-3, each of the framing members 150 can include at least one support portion 160 that is configured to further increase the structural strength of the polymeric inner frame 32. The support portions 160 are typically disposed proximate at least one of the plurality of framing edges 38, however, the support portions 160 can be configured in other orientations that include, but are not limited to, diagonal members, cross members, or other structurally supportive orientations.

As illustrated in FIGS. 2-3, each of the side framing members 34 is configured to include at least a portion of the one or more panel receptacles 48. Each panel receptacle 48 is configured to receive and support at least one of the vacuum insulated panels 50. Each of the vacuum insulated panels 50 includes an outer wall that defines an inner cavity with an insulation material disposed within the cavity. Each vacuum panel includes a barrier layer including at least one layer of polymeric barrier layers and at least one heat sealing layer. The one or more polymeric barrier layers can include, but are not limited to, ethylene vinyl alcohol co-polymer, or polyvinylidene chloride films. The barrier layer 52 can be disposed upon the vacuum insulated panels 50 by methods that include, but are not limited to, laminating, coating, rolling, or co-extruding the barrier layer 52 onto portions of the polymeric inner frame 32 and the vacuum insulated panels 50. Alternatively, these and other methods can be used to dispose the barrier layer 52 onto various components used in the manufacture of the vacuum insulated panels 50. In the various embodiments, the barrier layer 52 provides a hermetic surface to increase the ability of the vacuum insulated panels 50 to retain cooling within an interior 12 of the refrigerator 10. The cavity of each of the vacuum insulated panels 50 is hermetically sealed and at least partially pressurized to define the vacuum insulated panel 50.

Figure 4:
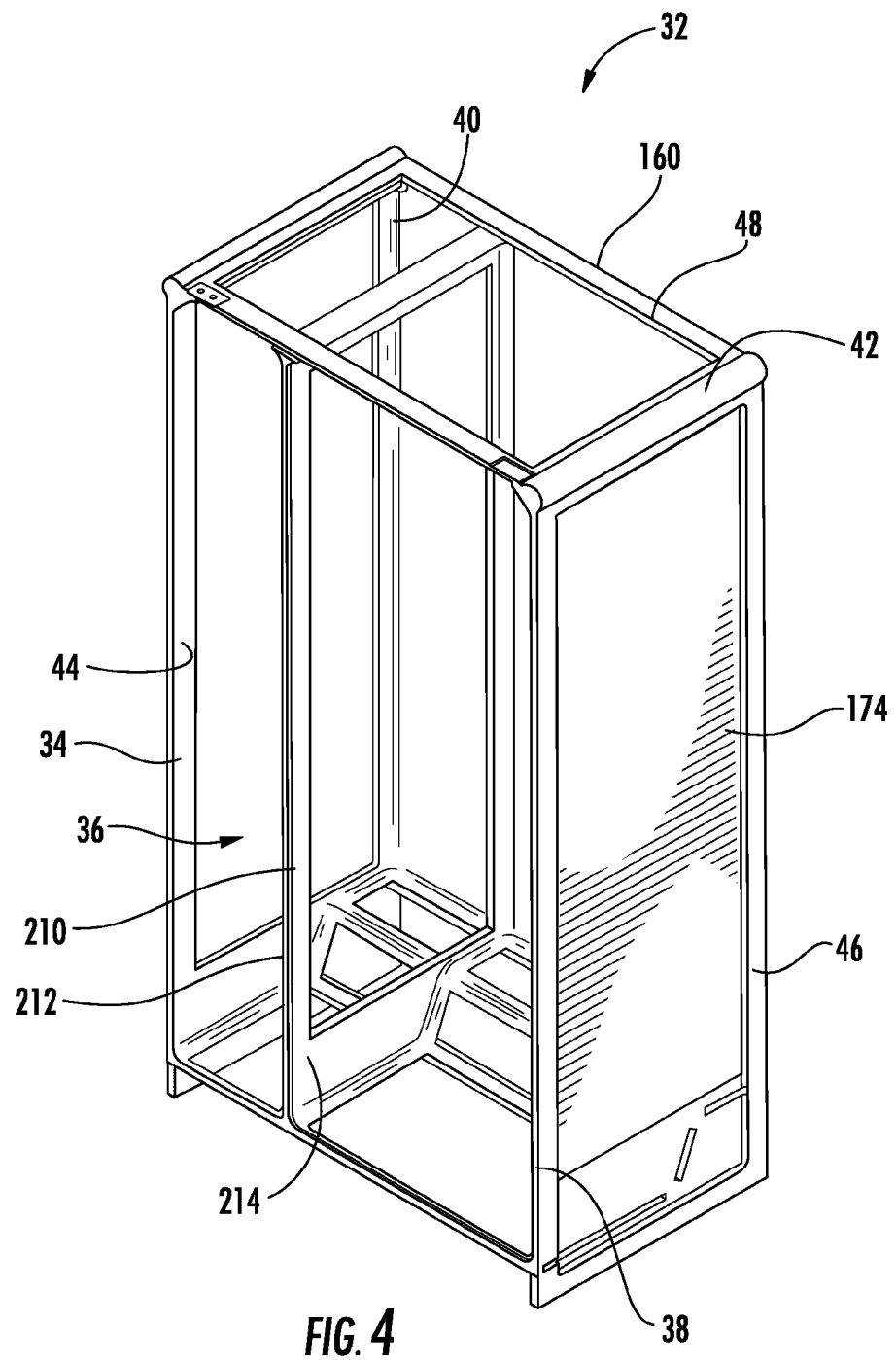
FIG. 4 is a top perspective view of the polymeric inner frame of FIG. 3.

As shown in the embodiment of FIGS. 2-4, each of the plurality of panel receptacles 48 defines a receptacle opening 170 within the polymeric inner frame 32 into which one of the plurality of vacuum insulated panels 50 is disposed and supported. In alternate embodiments, the panel receptacles 48 can include receptacle slots 172 defined by the framing members 150, where the vacuum insulated panel 50 is inserted into the slot and held by the receptacle in a predetermined configuration. In other alternate embodiments, each of the panel receptacles 48 can be defined by an offset 174 in each of the side framing members 34, wherein each of the plurality of vacuum insulated panels 50 is inserted into the offset 174. It should be understood that the exact configuration of each of the plurality of vacuum insulated panels 50, as well as the method for installing the vacuum insulated panels 50 within the panel receptacles 48 can vary.

As illustrated in FIGS. 2-4, the barrier layer 52 of the vacuum panel cabinet structure 30 is disposed proximate the inner facing surface 44 of the polymeric inner frame 32, such that the barrier layer 52 is disposed on at least a portion of each of the vacuum insulated panels 50 and at least a portion of the inner facing surface 44 of the polymeric inner frame 32.

Referring again to the embodiment as illustrated in FIGS. 1-2, 5 and 7, the liner 100 of the vacuum panel cabinet structure 30 is disposed within the inner frame opening 36 such that the liner outer facing surface 110 is disposed proximate the inner facing surface 44 of the polymeric inner frame 32 and at least a portion of the vacuum insulated panels 50. The liner 100 is configured such that the liner outer facing surface 110 is disposed on at least a portion of the polymeric inner frame 32 and at least a portion of the vacuum insulated panels 50, or alternatively, the barrier layer 52 that is disposed on the polymeric inner frame 32 and the vacuum insulated panels 50. In addition, the liner 100 can include at least one corner protuberance 190 proximate each of the outwardly expanded framing members. Each of the corner protuberances 190 includes a profile that matches the profile of the outwardly expanded framing member 42 such that the liner 100 can be disposed on at least a portion of the outward expanded framing member at the corner protuberance 190. The liner 100 can also include support protuberances that are configured to engage the support portions 160 of the polymeric inner frame 32.

Figure 5:
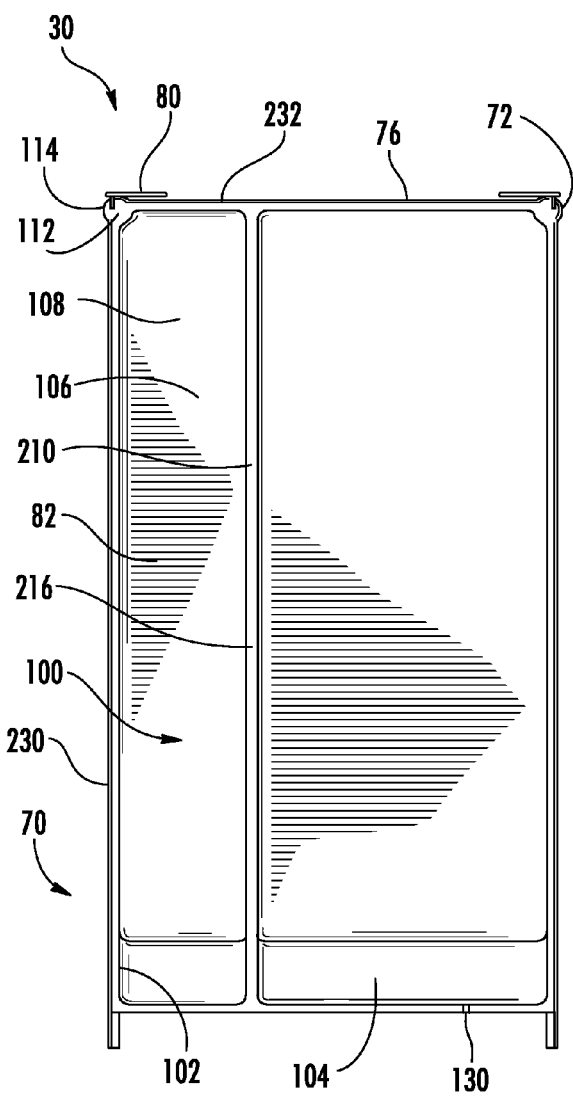
FIG. 5 is a front elevation view of another embodiment of the vacuum panel cabinet structure.
Figure 6:
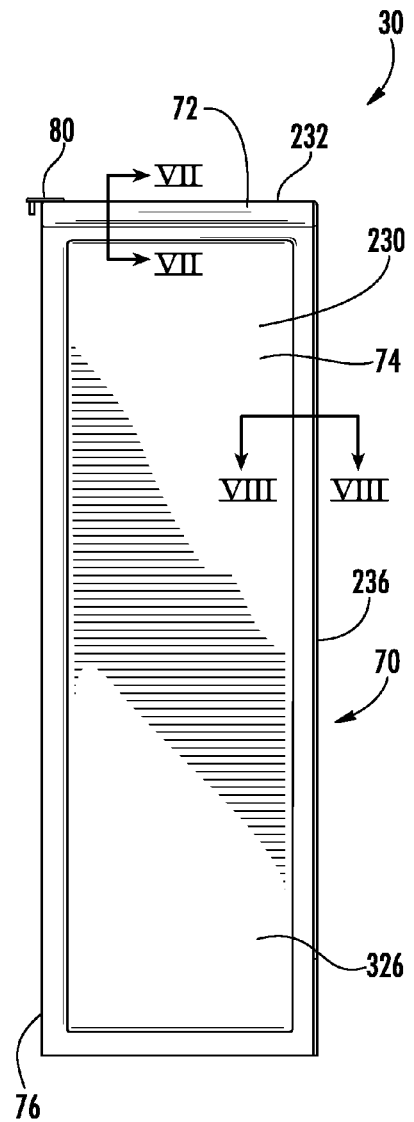
FIG. 6 is a side elevation view of the vacuum panel cabinet structure of FIG. 5.

As illustrated in FIGS. 2, 5 and 9, the liner perimetrical flange 112 extending from the liner opening 104 is configured to extend over at least a portion of the framing edges 38 of the polymeric inner frame 32 that are disposed proximate the inner frame opening 36. The liner perimetrical flange 112 is contoured such that it can cover these framing edges 38 including the support portions 160 and front ends 200 of the outwardly expanded framing members 42 that are located proximate the inner frame opening 36. In this manner, the liner perimetrical flange 112 extends outward from the liner opening 104 to the perimetrical edge 114 proximate the outer facing surface 46 of the polymeric inner frame 32.

According to one embodiment, the liner 100 can be made of materials that include, but are not limited to, high impact polystyrene or acrylonitrile butadiene styrene that has been thermally formed into the shape described above. The liner can either be thermally formed or, in alternate embodiments, can be formed by plastic injection or injection molding. While not preferred, it is understood that the liner 100 can be formed from a single member, or by connecting various members together to form the liner 100 as described above.

Referring now to FIGS. 1-5, the vacuum panel cabinet structure 30 can include a mullion member 210. The mullion member 210 includes a polyurethane mullion frame 212 that is coupled with at least a portion of the inner facing surface 44 of the polymeric inner frame 32. The polyurethane mullion frame 212 includes at least one of the plurality of panel receptacles 48, wherein one of the plurality of vacuum insulated panels 50 is sized and configured for reception in the panel receptacle 48 of the polyurethane mullion frame 212. A portion of the barrier layer 52 can be disposed upon at least a portion of the polyurethane mullion frame 212 and the vacuum insulated panel 50 that is disposed within the panel receptacle 48 of the polyurethane mullion frame 212. The polyurethane mullion frame 212 and the vacuum insulated panel 50 disposed therein define a mullion member outer surface 214. A mullion portion 216 of the liner outer facing surface 110 is configured such that, when the liner 100 is disposed within the inner frame opening 36 proximate the inner facing surface 44 of the polymeric inner frame 32, the mullion portion 216 of the liner outer facing surface 110 is disposed proximate the mullion member outer surface 214. In this manner, the liner inner facing surface 108 defines at least two compartments 16 of the vacuum panel cabinet structure 30. It should be understood that the number and configuration of the mullion members 210 disposed within the vacuum panel cabinet structure 30 can vary. By way of explanation and not limitation, two or more mullion members 210 can be included in the vacuum panel cabinet structure 30 to define three or more compartments 16 within the vacuum panel cabinet structure 30.

In alternate embodiments, the mullion members 210 can be configured vertically or horizontally within the vacuum panel cabinet structure 30 or can be configured in different orientations within the same vacuum panel cabinet structure 30. In still other alternate embodiments, the mullion member 210 can include more complex geometries that can include, but are not limited to, "T" or "+" configurations.

In yet other alternate embodiments, the liner inner facing surface 108 within each of the compartments 16 can include platform receptacles for receiving one or more interior platforms. In various embodiments, one or more of the platform receptacles can also be used as a structural member for the vacuum panel cabinet structure 30, wherein the polymeric inner frame 32, the liner 100, or both, have an increased thickness at one or more of the platform receptacles to provide additional structural support to the vacuum panel cabinet structure 30.

Referring again to the illustrated embodiment as shown in FIGS. 1-2, 5-6 and 13-14, the outer enclosure 70 of the vacuum panel cabinet structure 30 includes two side panels 230, top and bottom panels 232, 234, and a back panel 236, wherein the two side panels 230 and the top and bottom panels 232, 234 define the enclosure rim 76 and the enclosure opening 78. The inward surface 82 of the outer enclosure 70 defines the structure receptacle 84 for receiving the polymeric inner frame 32 with the vacuum insulated panels 50 and the barrier layer 52 disposed thereon, as well as the liner 100 disposed on the inner facing surface 44 of the polymeric inner frame 32. The extruded support channels 72 of the outer enclosure 70 are configured to have a profile substantially similar to that of the outwardly expanded framing members 42, such that the inner surface of the outer enclosure 70 is disposed on at least a portion of the outwardly expanded members 42. In addition, at least a portion of the outer enclosure 70 is configured to be disposed upon at least a portion of the support portions 160 of the polymeric inner frame 32. In this manner, the outer enclosure 70 provides additional support to the outwardly expanded framing members 42 and the support portions 160 of the polymeric inner frame 32, thereby providing additional support to the vacuum panel cabinet structure 30 as a whole.

Referring now to the embodiment as illustrated in FIGS. 9-11, the outwardly contoured hinges 80 each include a hinge body 250 disposed at least partially on the outward surface 74 of the outer enclosure 70 and a reinforcing portion 252 disposed at least partially on the inward surface 82 of the outer enclosure 70. At least one connection member 254 couples the hinge body 250 to the reinforcing portion 252, such that the outwardly contoured hinge 80 is disposed on the outer enclosure 70 proximate one of the outwardly expanded framing members 42. The outwardly contoured hinge 80 includes an extension arm 256 that substantially wraps around one of the outwardly expanded framing members 42 to a hinge end 258, wherein the hinge end 258 includes a hinge pin 260 for connecting a door 262 to the vacuum panel cabinet structure 30. The hinge body 250 includes a perimetrical channel 264 that extends around the hinge body 250 and the extension arm 256 to provide additional structural support to the hinge body 250 and the outwardly contoured hinge 80 as a whole. The hinge body 250 also includes one or more connector receptacles 266 for receiving the connection members 254 of the outwardly contoured hinge 80. Typically, the connection members 254 include screw or bolt type fasteners with cooperative nuts that tighten the outwardly contoured hinge 80 to the outer enclosure 70 in the location described above. The connecting members 254 can also include other types of connectors and fasteners that can include, but are not limited to, rivets, welds, clasps, pins, and other connecting fastening mechanisms.

As illustrated in FIGS. 9-11, the reinforcing portion 252 of the outwardly contoured hinge 80 is disposed on the inward surface 82 of the outer enclosure 70 such that, when the vacuum panel cabinet structure 30 is assembled, at least a portion of the reinforcing portion 252 is disposed between the outer enclosure 70 and the polymeric inner frame 32. In this manner, the polymeric inner frame 32 or the outer enclosure 70, or both, may include an offset portion to accommodate the reinforcing portion 252 of the outwardly contoured hinge 80 being disposed therein. In various embodiments, the reinforcing portion 252 can include a reinforcing arm 276 that cooperates with the hinge body 250 of the outwardly contoured hinge 80 to form the extension arm 256 of the outwardly contoured hinge 80. The reinforcing portion 252 can also include at least one of the connector receptacles 266 for receiving the connecting members 254 that couple the outwardly contoured hinge 80 to the outer enclosure 70, as described above.

Referring now to the embodiment as illustrated in FIG. 12, the hinge body 250 and the reinforcing portion 252 of the outwardly contoured hinge 80 can cooperate to form an extruded hole 278 for receiving the connecting member 254. In this embodiment, the hinge body 250 includes an upper flared member 280 that cooperates with a lower flared member 282 of the reinforcing portion 252. The lower flared member 282 of the reinforcing portion 252 extends upward and through the outer enclosure 70 to engage the upper flared member 280 of the hinge body 250 of the outwardly contoured hinge 80. The connecting member 254 is then disposed through the extruded hole 278 to engage the outwardly contoured hinge 80 and the outer enclosure 70 to couple the outwardly contoured hinge 80 to the outer enclosure 70. In alternate embodiments, the lower flared member 282 of the reinforcing portion 252 of the outwardly contoured hinge 80 can include an integral post connector that extends upward through the outer enclosure 70 and through the upper flared member 280 of the hinge body 250 of the outwardly contoured hinge 80 to couple the outwardly contoured hinge 80 to the outer enclosure 70.

Referring again to the embodiments as illustrated in FIGS. 1-2, 5-6 and 13-14, the outer enclosure 70 can include a single metal piece that is formed, stamped, or otherwise contoured into a configuration necessary to form the outer enclosure 70 of the vacuum panel cabinet structure 30. In alternate embodiments, the back panel 236 and the bottom panel 234 can include separate embers that are coupled together with the side and top panels 230, 232 to form the outer enclosure 70. In still other alternate embodiments, the outer enclosure can be formed by coupling together several individual panels to form the outer enclosure 70 as described above. In addition, a plurality of structural recesses 290 can be disclosed within the outer enclosure 70 to provide additional structural support to the outer enclosure 70 and the vacuum panel cabinet structure 30. The structural recesses 290 can be configured in a diagonal orientation across one or more of the side, top, back, or bottom panels of the outer enclosure 70. It should be understood that the structural recesses 290 can include various other configurations that can include, but are not limited to, horizontal or vertical configurations, or a combination of horizontal, vertical and diagonal configurations, or some other configuration that is sufficient to provide structural support to the outer enclosure 70.

In various embodiments, the outer enclosure 70 can be made of a metal material that can include, but is not limited to, aluminum, steel, or other formable metallic material. The outwardly contoured hinge 80 can be made of a metallic material that is substantially strong enough to support the weight of a door 262 of the refrigerator 10 door and any contents disposed therein and can include, but is not limited to, steel, aluminum, or other structurally sufficient metallic material.

Figure 14:
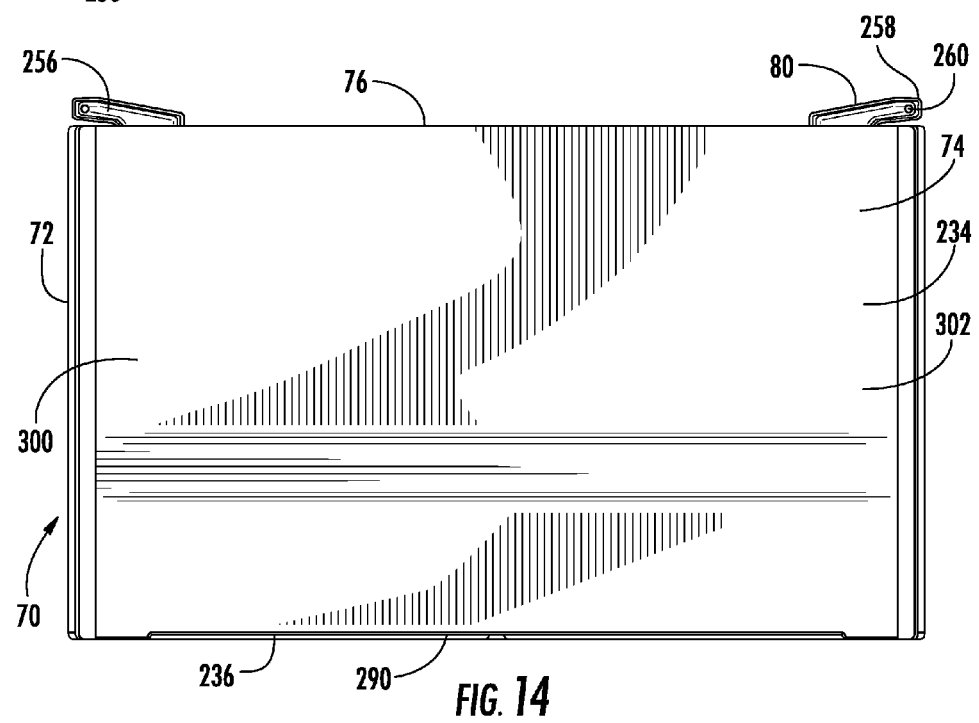
FIG. 14 is a bottom plan view of the vacuum panel cabinet structure of FIG. 5.
Figure 15:
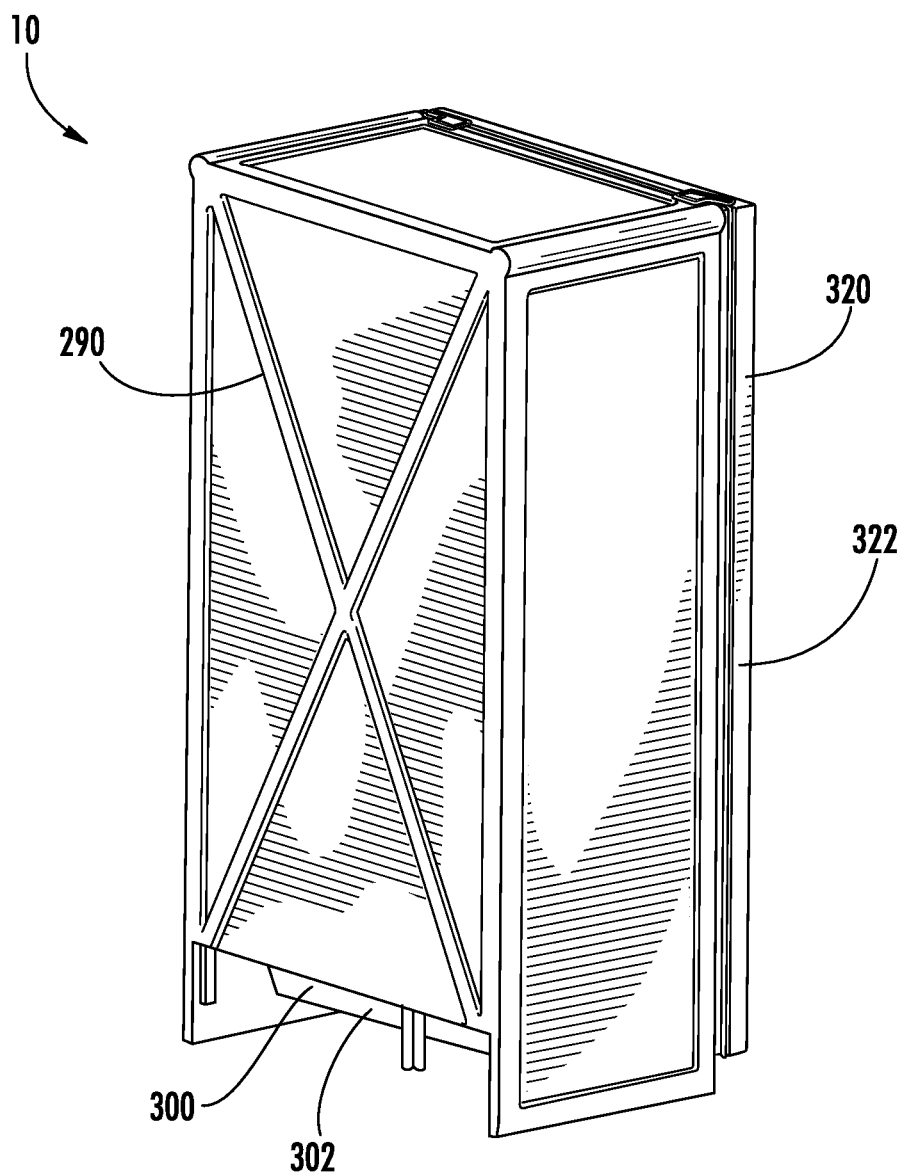
FIG. 15 is a top rear perspective view of the vacuum panel cabinet structure of FIG. 1, with the doors in the closed position.

Referring now to the embodiment of FIGS. 14-15, the vacuum panel cabinet structure 30 can include one or more cavity recesses 300 that provide a space for disposing mechanical aspects of the refrigerator 10 proximate the vacuum panel cabinet structure 30. The cavity recesses 300 defined by an inward protruding portion 302 of the vacuum panel cabinet structure 30, wherein the outer enclosure 70, the liner 100, and the polymeric inner frame 32 cooperatively protrude inward to define the cavity recess 300.

Figure 16:
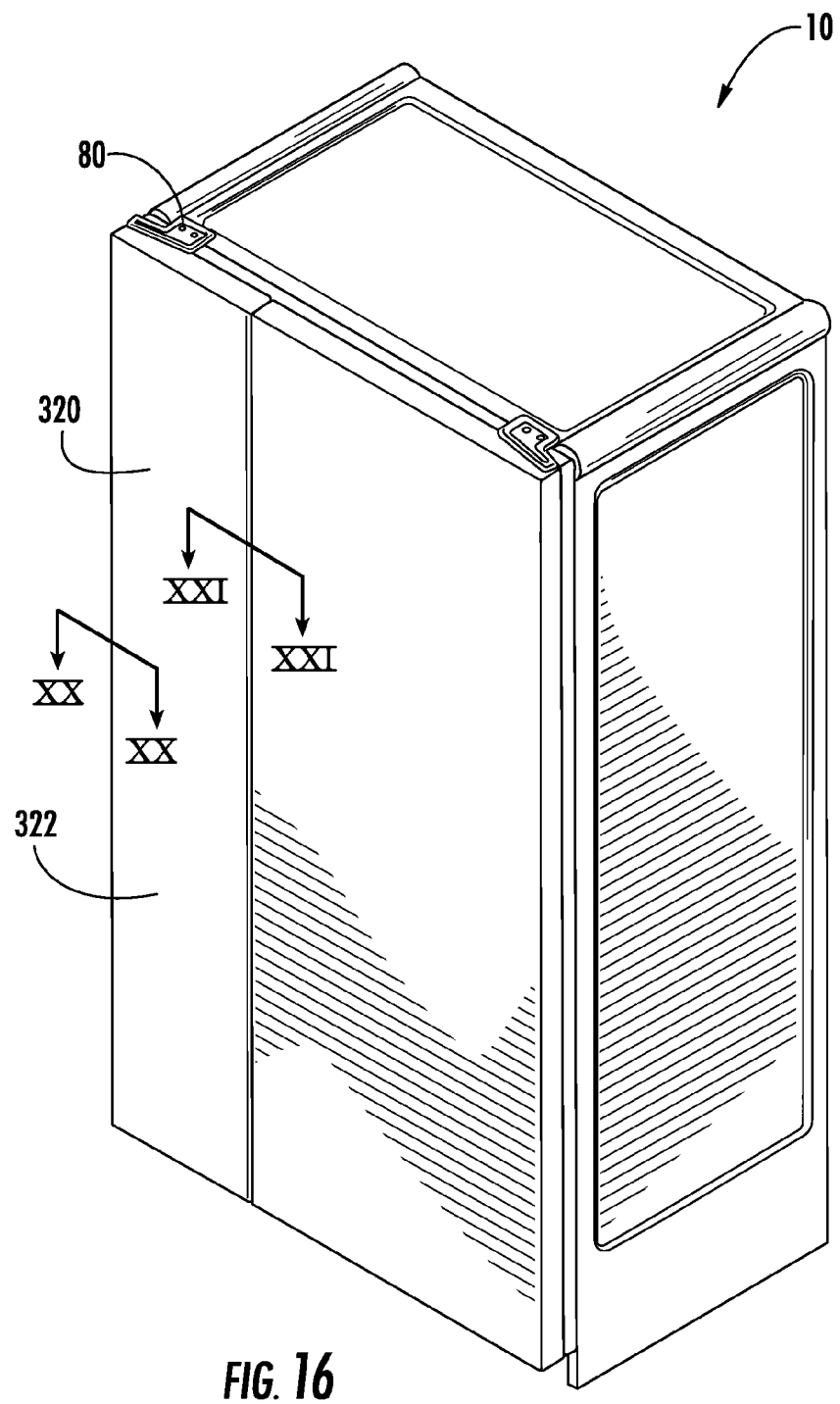
FIG. 16 is a top front perspective view of the vacuum panel cabinet structure of FIG. 15.

Referring now to the embodiments of FIGS. 15-16, the refrigerator 10 can include a metal clad covering 320 having a finished outer surface 322 and an interior surface 324. The interior surface 324 of the metal clad covering 320 is configured to be disposed on at least a portion of an exterior surface 326 of the vacuum panel cabinet structure 30. The finished outer surface 322 of the metal clad covering 320 can have varying finishes that can include, but are not limited to, painted metal, stainless steel, magnetic steel-type finishes, or other metallic finish. The interior surface 324 of the metal clad covering 320 defines a cabinet receptacle 328 for receiving the exterior surface 326 of the vacuum panel cabinet structure 30. In various other alternate embodiments, the exterior surface 326 of the vacuum panel cabinet structure 30 can include the finished outer surface 322. In such an embodiment, the metallic finishes described above, or various indicia, patterns, or colors can be disposed on the exterior surface 326 of the vacuum panel cabinet structure 30.

Figure 17:
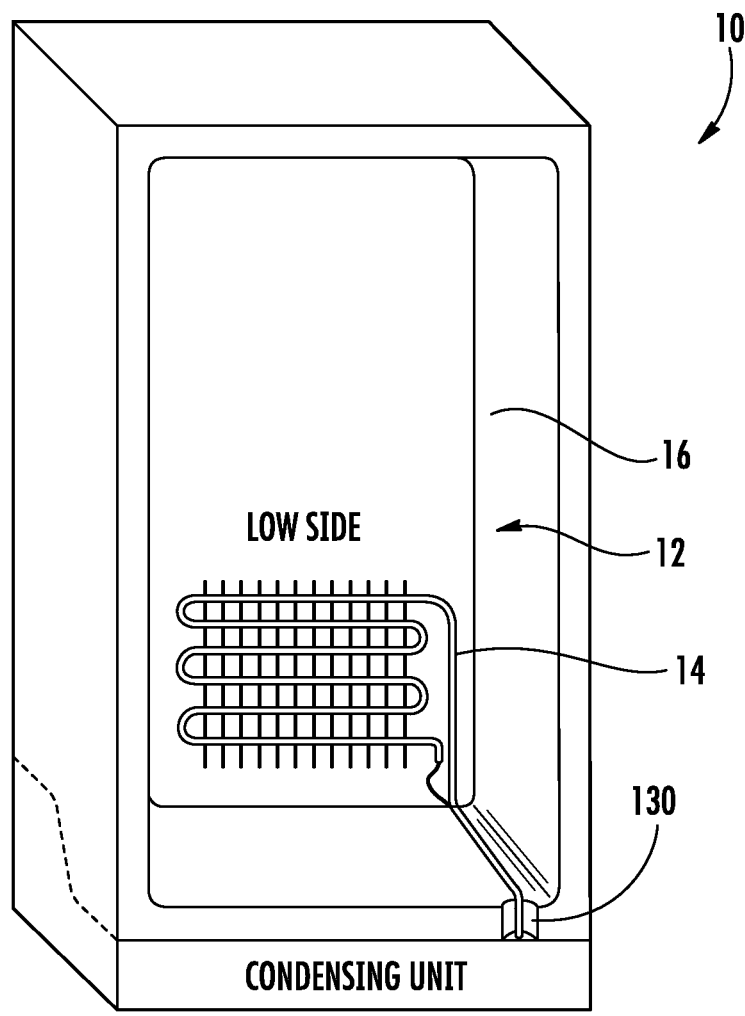
FIG. 17 is a schematic view of another embodiment of the vacuum panel cabinet structure.
Figure 18:
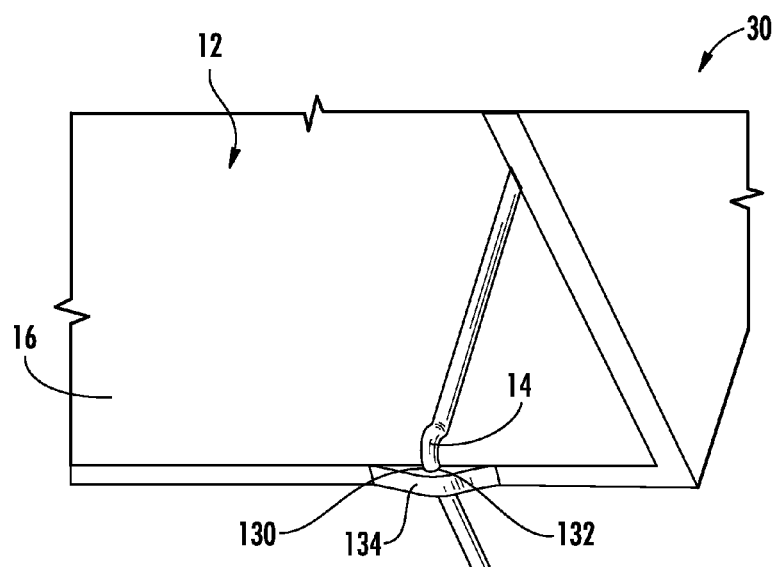
FIG. 18 is a detail schematic view of one embodiment of the vacuum panel cabinet structure.
Figure 19:
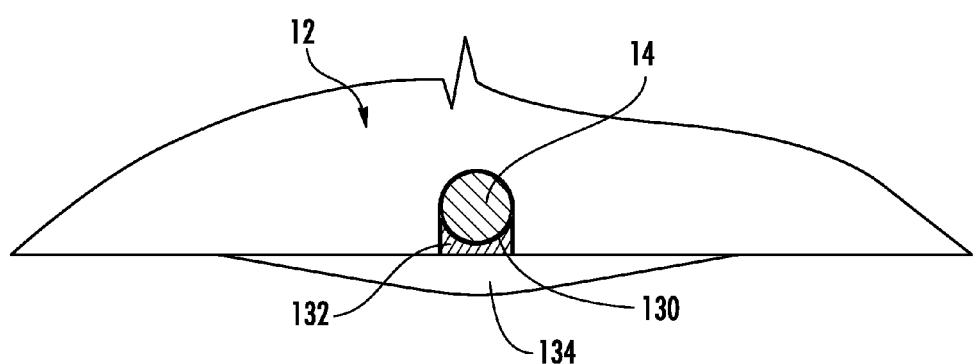
FIG. 19 is a detail schematic view of the vacuum panel cabinet structure of FIG. 18.

Referring now to the embodiment as illustrated in FIGS. 17-19, the infrastructure notch 130 of the vacuum panel cabinet structure 30 is disposed proximate the liner perimetrical flange 112 and includes the filler member 132 that hermetically seals the infrastructure notch 130. The infrastructure notch 130 is configured to receive and provide a path of travel for at least a portion of the cooling loop 14 that supports the mechanical aspects of the refrigerator 10 disposed in the cavity recess 300. The cooling loop 14 is configured to pass through the infrastructure notch 130 and into the interior 12 of the refrigerator 10 to additional mechanical aspects that can include, but are not limited to, evaporators, specialty cooling modules, and other mechanical aspects of a refrigerator 10. Where the cooling loop 14 passes through the infrastructure notch 130, the filler material provides a hermetic seal within the infrastructure notch 130 and around the portion of the cooling loop 14 disposed within the infrastructure notch 130. In various embodiments, the gasket 134 can be disposed on at least a portion of the liner perimetrical flange 112 proximate the infrastructure notch 130 to further seal the infrastructure notch 130. It should be understood that the location and number of infrastructure notches 130 can vary depending upon the cooling features and other mechanical features included within the refrigerator 10. In this manner, the use of the infrastructure notches 130 substantially limits the need to provide conduits or other openings through the vacuum panel cabinet structure 30. The number and size of openings in the vacuum panel cabinet structure 30 that need to be installed within the vacuum panel cabinet structure 30 are thereby limited, while also providing for the mechanical functions of the refrigerator 10.

Figure 20:
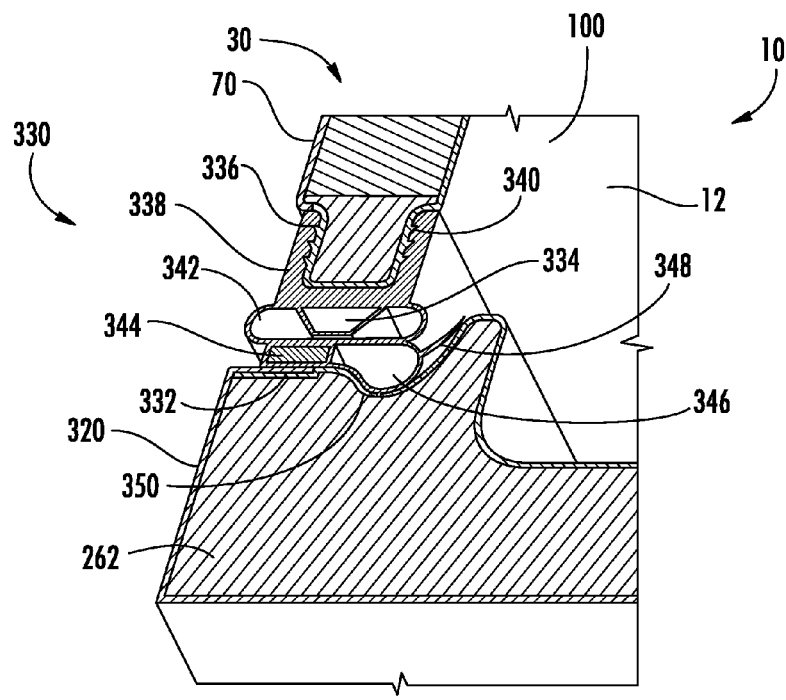
FIG. 20 is a detail section view of the vacuum panel cabinet structure of FIG. 16 taken at line XX-XX.
Figure 21:
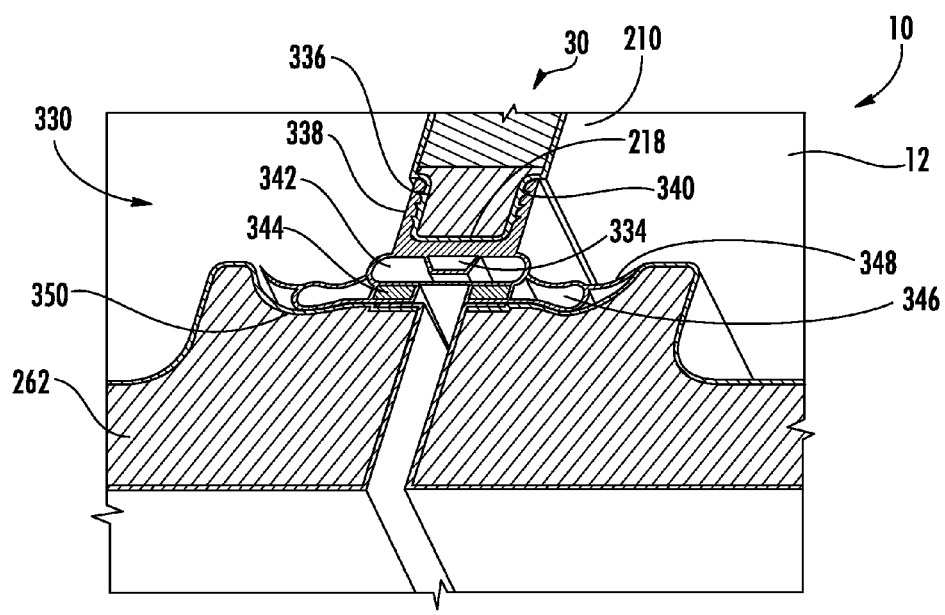
FIG. 21 is a detail section view of the vacuum panel cabinet structure of FIG. 16 taken at line XXI-XXI.

As illustrated in FIGS. 20-21, in various embodiments, a magnetic gasket 330 is included on the vacuum panel cabinet structure 30 proximate the liner perimetrical flange 112 and a mullion edge 218 of the mullion member 210 at a cabinet rim 336 to provide a seal between the at least one door 262 and the vacuum panel cabinet structure 30. The magnetic gasket 330 substantially seals the interior 12 of the refrigerator 10 and substantially limits the amount of cooling that escapes the interior 12 of the refrigerator 10 when the at least one door 262 is in the closed position. The magnetic gasket 330 includes a gasket channel 338 that is configured to engage the cabinet rim 336 and extend around at least a portion of an interior surface 340 of the vacuum panel cabinet structure 30. A tubular extruded portion 342 is disposed proximate the gasket channel 338, wherein the tubular extruded portion 342 includes at least one elongated magnet member 344. The elongated magnet member 344 is configured to engage a magnetic portion 332 disposed on at least a portion of the at least one door 262 of the refrigerator 10. In various embodiments, the magnetic portion 332 can include, but is not limited to, the outer enclosure 70 or the metal clad covering 320.

As illustrated in FIGS. 20-21, the elongated magnet member 344 selectively cooperates with the magnetic portion 332 disposed on the at least one door 262 to bias the at least one door 262 toward the cabinet rim 336 when the at least one door 262 is disposed in or substantially near the closed position. As the door 262 moves to the closed position, the elongated magnet member 344 is pulled toward the magnetic material, thereby extending the tubular extruded portion 342 such that the elongated magnet member 344 can outwardly extend toward and engage the magnetic portion 332 of the door 262. The tubular extruded portion 342 includes a compression limiting channel 334 that is configured to substantially prevent the tubular extruded portion 342 from fully compressing, thereby substantially limiting damage that may occur when the at least one door 262 is closed in a rapid or forceful manner.

As illustrated in FIGS. 20-21, the magnetic gasket 330 includes at least one flared tubular member 346 disposed proximate the tubular extruded portion 342 and the at least one elongated magnet member 344. At least one extruded flange 348 is disposed proximate the at least one flared tubular member 346, wherein the at least one flared tubular member 346 and the at least one extruded flange 348 are configured to further engage at least a portion of a perimeter recess 350 of the at least one door 262. In this manner, when the at least one door 262 is placed in the closed position, the at least one flared tubular member 346 and the at least one extruded flange 348 are compressed against the perimeter recess 350 of the at least one door 262 to create a seal between the at least one door 262 and the cabinet rim 336 of the vacuum panel cabinet structure 30. In alternate embodiments, a heat loop can be included proximate the cabinet rim 336 to provide heating to the magnetic gasket 330 to substantially prevent condensation from forming proximate the magnetic gasket 330 and substantially prevent unsightly dirt and particulate matter from gathering in this area. In this embodiment and other various embodiments, the cabinet rim 336 can be strengthened the inclusion of a structural enhancement such proximate the cabinet rim 336. This structural enhancement can include, but is not limited to a metallic, or polymeric or plastic member configured to strengthen the cabinet rim 336 of the vacuum panel cabinet structure 30.

In various embodiments, the magnetic gasket 330 can include a two-part member wherein the elongated magnet member is disposed proximate the cabinet rim, and wherein the tubular extruded portion 342, the flared tubular member 346 and the extruded flange 348 are disposed proximate the perimeter recess 350 of the door 262.

In various embodiments the magnetic gasket 330 can be covered by a plastic covering that conceals at least a portion of the magnetic gasket 330. The plastic covering can include a plurality of portions that can include, but are not limited to, a substantially flexible PVC inner portion and a substantially rigid PVC outer portion. In various embodiments, the plastic covering can include an extruded dual durometer PVC member.

Figure 7:
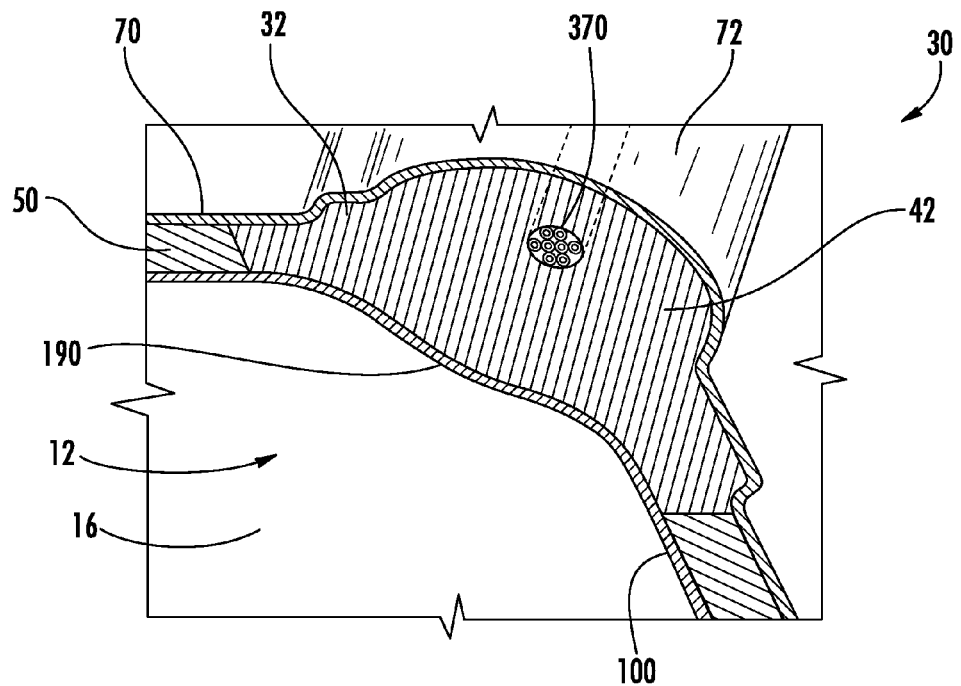
FIG. 7 is a detail section view of the vacuum panel cabinet structure of FIG. 6 taken at line VII-VII.
Figure 8:
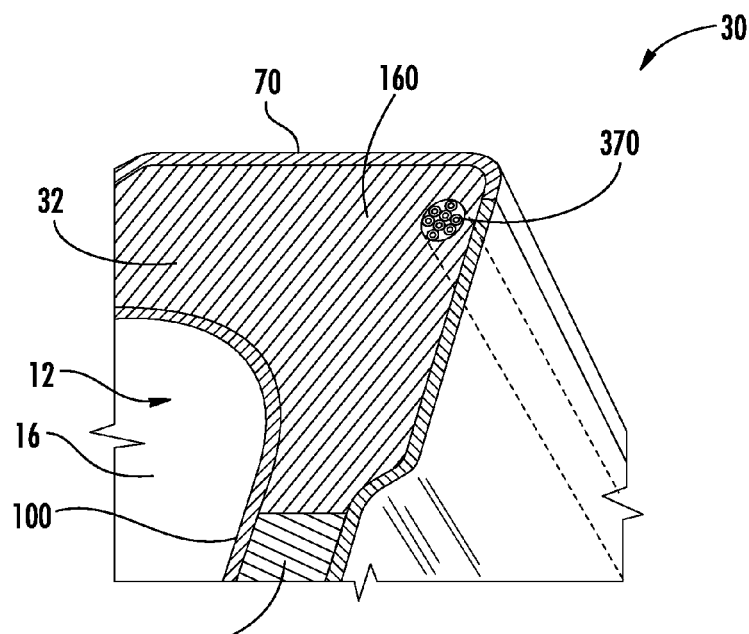
FIG. 8 is a detail section view of the vacuum panel cabinet structure of FIG. 6 taken at line VIII-VIII.
Figure 13:
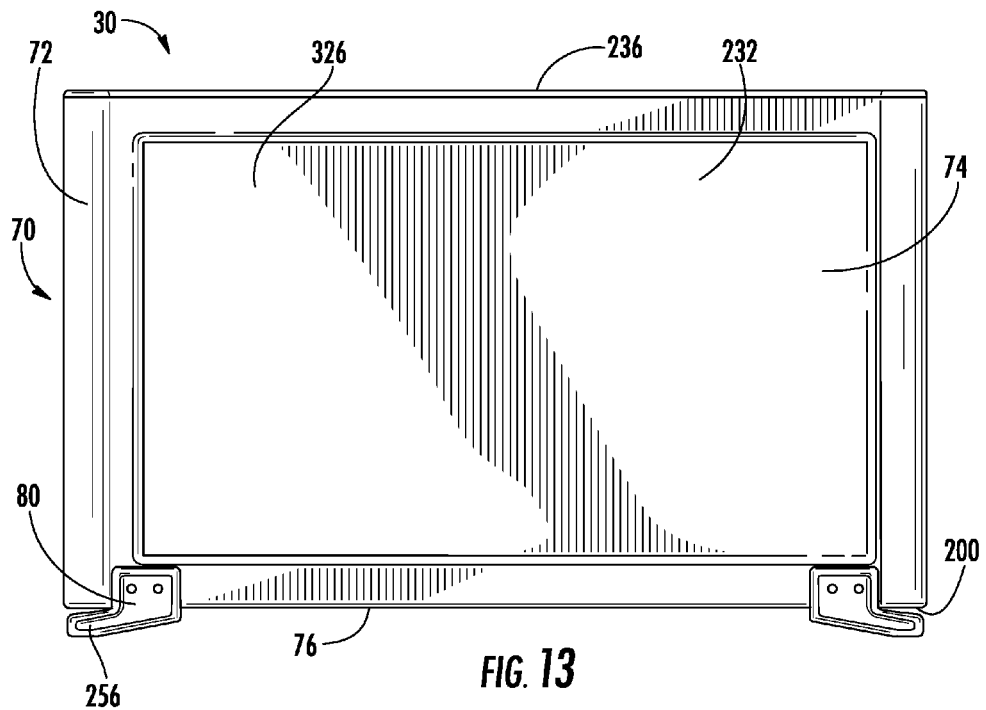
FIG. 13 is a top plan view of the vacuum panel cabinet structure of FIG. 5.

Referring now to FIGS. 7-8, the vacuum panel cabinet structure 30 can include one or more conduits 370 disposed within the polymeric inner frame 32 to provide a path of travel for mechanical and electrical aspects of the refrigerator 10 through the vacuum panel cabinet structure 30 and the refrigerator 10 in general. Because of the increased cross-sectional thickness of the polymeric inner frame 32 in certain portions, the conduits 370 are typically disposed within the support portions 160 and the outwardly expanded framing members 42 of the polymeric inner frame 32. In this manner, the conduits 370 provide a path of travel through the vacuum panel cabinet structure 30 while minimizing the loss of insulative properties of the vacuum panel cabinet structure 30 due to the loss of material as a result of the conduits 370. The conduits can be formed as part of the polymeric inner frame, or, in alternate embodiments, installed after the formation of the polymeric inner frame 32.

In various embodiments, the typical cross-sectional thickness of the vacuum panel cabinet structure 30 constructed, as described above, can be approximately 15 mm measured from the outward surface 74 of the outer enclosure 70 to the liner inner facing surface 108. Portions of the vacuum panel cabinet structure 30, which can include, but are not limited to, the support portions 160 and the outwardly expanded framing members 42, typically have a greater thickness. It should be understood that the vacuum panel cabinet structure 30 can be configured to have a variety of minimum cross-sectional thicknesses that can be greater than 15 mm.

Figure 22:
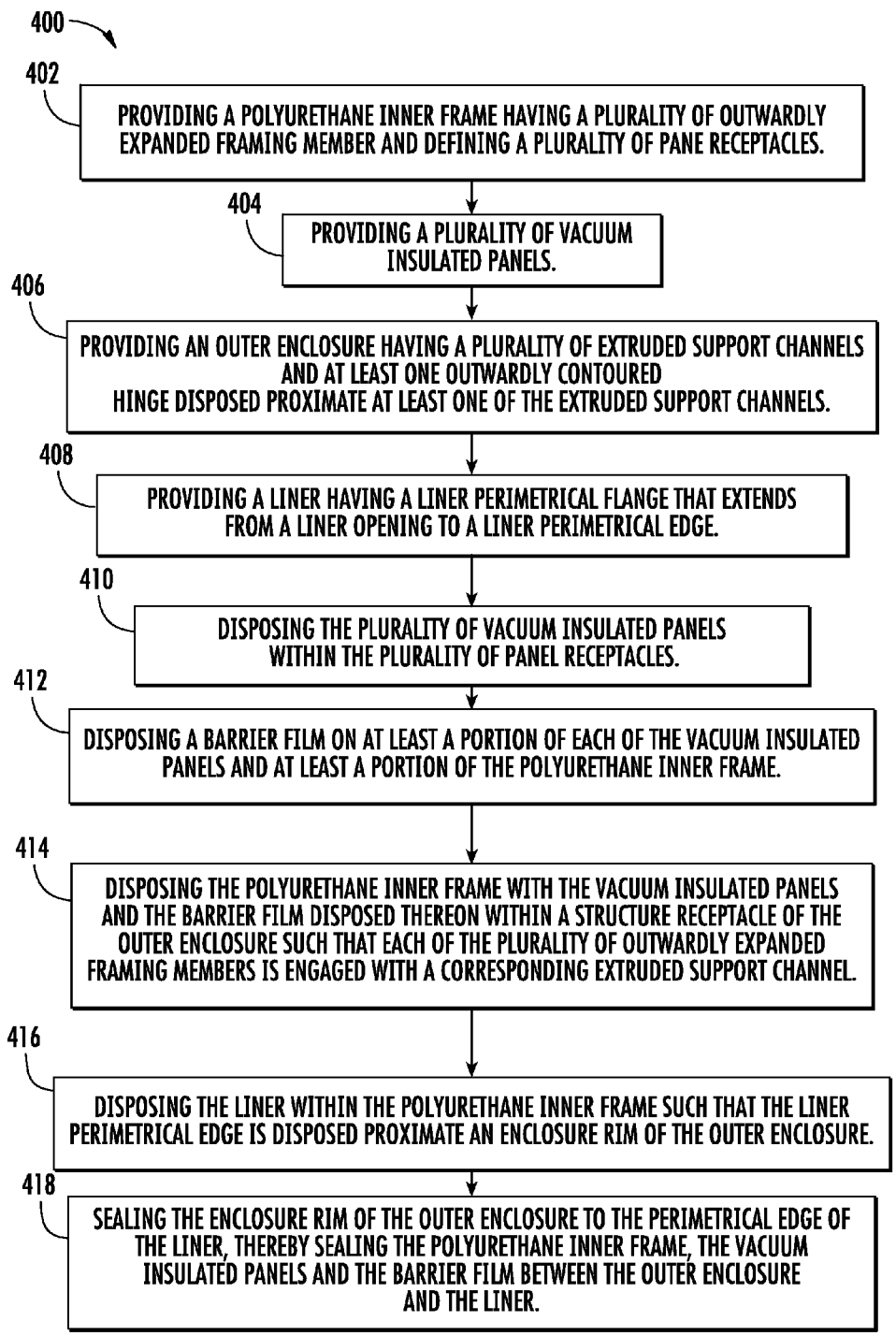
FIG. 22 is a flow-chart diagram of a method for creating one embodiment of the vacuum panel cabinet structure.

Another aspect of the vacuum panel cabinet structure 30, as illustrated in FIG. 22, includes a method 400 for creating the vacuum panel cabinet structure 30. A step 402 of this method 400 includes providing the polymeric inner frame 32 having the at least four side framing members 34 that define the inner frame opening 36, where the polymeric inner frame 32 also includes the plurality of framing edges 38, the back framing member 40 coupled to at least one of the plurality of framing edges 38, the at least one outwardly expanded framing member is disposed proximate at least one of the plurality of framing edges 38, the inner facing surface 44, and the outer facing surface 46. The at least four side framing members 34 and the back framing member 40 define the plurality of panel receptacles 48.

Another step 404 in the method 400 includes providing the plurality of vacuum insulated panels 50 configured for reception in the plurality of panel receptacles 48.

The method 400 also includes the step 406 of providing the outer enclosure 70 and disposing the at least one outwardly contoured hinge 80 onto the outer enclosure 70 proximate one of the outwardly expanded framing members 42, wherein the outwardly contoured hinge 80 includes an extension arm 256 that extends around the outwardly expanded framing member 42. The outwardly contoured hinge 80 can include the hinge body 250, the reinforcing portion 252, and the connection members 254 that couples the hinge body 250 to the reinforcing portion 252 and disposes the outwardly contoured hinge 80 to the outer enclosure 70.

Another step 408 in the method 400 includes providing the liner 100 having a liner perimeter flange 112 that extends from a liner opening 104 to a liner perimetrical edge 114.

Another step 410 in the method 400 includes disposing the vacuum insulated panels 50 within the plurality of panel receptacles 48.

The method 400 also includes the step 412 of disposing the barrier layer 52 comprising a hermetic barrier layer and a heat sealing layer onto at least a portion of the vacuum insulated panel 50 and at least a portion of the polymeric inner frame 32.

Another step 414 in the method 400 includes disposing the polymeric inner frame 32 with the vacuum insulated panels 50 and the barrier layer 52 disposed thereon into the structure receptacle 84 of the outer enclosure 70. In this manner, the inward surface 82 of the outer enclosure 70 engages at least a portion of the outer facing surface 46 of the polymeric inner frame 32.

Yet another step 416 in the method 400 includes disposing the liner 100 within the inner structure opening, such that the liner outer facing surface 110 is disposed proximate the inner facing surface 44 of the polymeric inner frame 32. The liner perimetrical flange 112 of the liner 100 is then disposed to the enclosure rim 76 of the outer enclosure 70 to define the vacuum panel cabinet structure 30.

Yet another step 418 in the method 400 includes hermetically sealing the liner 100 to the outer enclosure 70 such that the perimetrical edge 114 of the liner 100 is disposed proximate the enclosure rim 76 of the outer enclosure 70. This step 418 can also include providing at least one infrastructure notch 130 defined by the vacuum panel cabinet structure 30, such that the at least one infrastructure notch 130 is disposed proximate the liner perimetrical flange 112. A filler material is disposed within the infrastructure notch 130 to hermetically seal the infrastructure notch 130. This step also includes selectively disposing a gasket 134 on at least a portion of the liner perimetrical flange 112 such that, when the gasket 134 selectively engages the liner perimetrical flange 112, the gasket 134 further seals the infrastructure notch 130.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

The invention claimed is:

1. A vacuum panel cabinet structure comprising:
a polymeric inner frame having at least four side framing members defining an inner frame opening, a plurality of framing edges, a back framing member coupled to at least one of the plurality of framing edges, at least one outwardly expanded framing member disposed proximate at least one of the plurality of framing edges, an inner facing surface, and an outer facing surface, wherein the at least four side framing members and the back framing member define a plurality of panel receptacles;
a plurality of vacuum insulated panels sized and configured for reception in the plurality of panel receptacles;
a barrier layer comprising a hermetic barrier layer and a heat sealing layer disposed on at least a portion of the vacuum insulated panels and at least a portion of the polymeric inner frame;
an outer enclosure having at least one extruded support channel configured to engage the at least one outwardly expanded framing member of the polymeric inner frame, an outer facing surface, an enclosure rim defining an enclosure opening, at least one outwardly contoured hinge disposed proximate at least one of the at least one extruded support channel, and an inner facing surface defining a receptacle for receiving the polymeric inner frame, wherein the inner facing surface of the outer enclosure engages at least a portion of the outer facing surface of the polymeric inner frame;
a liner having at least four sidewalls defining a liner opening, a liner back panel, a liner inner facing surface, a liner outer facing surface, and a liner perimetrical flange extending away from the liner opening, wherein the liner outer facing surface is disposed within the inner frame opening of the polymeric inner frame proximate the inner facing surface of the polymeric inner frame, and wherein the liner perimetrical flange is disposed to the outer enclosure proximate the enclosure rim, thereby defining the vacuum panel cabinet structure; and
at least one infrastructure notch defined by the cabinet structure proximate the liner perimetrical flange, wherein a filler member hermetically seals the infrastructure notch, and wherein a gasket is selectively disposed on at least a portion of the liner perimetrical flange.

2. The vacuum panel cabinet structure of claim 1, wherein the at least one outwardly contoured hinge includes a hinge body disposed on the outer facing surface of the outer enclosure, a reinforcing portion disposed on the inner facing surface of the outer enclosure, and at least one connection member that couples the hinge body to the reinforcing portion, wherein the at least one outwardly contoured hinge is disposed proximate at least one of the at least one outwardly expanded framing member, and wherein the at least one outwardly contoured hinge extends around at least one of the at least one outwardly expanded framing member.

3. The vacuum panel cabinet structure of claim 2, wherein the reinforcing portion of the at least one outwardly contoured hinge includes at least one upper flared member that extends upward through the outer enclosure and couples to a body portion, wherein the reinforcing portion and the body portion define at least one extruded hole through the at least one upper flared member, and wherein the at least one connection member couples the at least one outwardly contoured hinge to the outer enclosure at the at least one extruded hole.

4. The vacuum panel cabinet structure of claim 1, wherein the outer enclosure includes a metallic back panel and a metallic bottom cover, wherein the outer enclosure includes a plurality of structural recesses.

5. The vacuum panel cabinet structure of claim 1, wherein the polymeric inner frame includes at least one conduit defined within at least one of the at least one outwardly expanded framing member.

6. The vacuum panel cabinet structure of claim 1 further comprising:
a mullion member including a polyurethane mullion frame that defines one of the plurality of panel receptacles, wherein the polyurethane mullion frame is coupled with at least a portion of the inner facing surface of the polymeric inner frame, and wherein one of the plurality of vacuum insulated panels is sized and configured for reception in the panel receptacle of the polyurethane mullion frame;
a mullion member outer surface; and
a mullion portion of the liner outer facing surface, wherein the mullion portion is disposed to at least a portion of the mullion member outer surface, and wherein the liner inner facing surface defines at least two compartments of the vacuum panel cabinet structure.

7. The vacuum panel cabinet structure of claim 1, wherein the gasket is disposed on at least one operable panel of the vacuum insulated cabinet structure, wherein the at least one operable panel is operable between open and closed positions, and wherein when the at least one operable panel is in the closed position, the gasket is selectively engaged to at least a portion of the liner perimetrical flange thereby providing a substantially hermetic seal between the panel and the liner perimetrical flange and further sealing the infrastructure notch.

8. An appliance having a vacuum panel cabinet structure, the appliance comprising:
an inner structure having a plurality of polyurethane framing members defining a plurality of panel receptacles and a plurality of vacuum insulated panels disposed within the plurality of panel receptacles, wherein the inner structure includes at least four framing walls defining an inner frame opening, a back framing wall, a plurality of outwardly expanded framing members disposed proximate at least one of the plurality of polyurethane framing members, an inner facing surface, and an outer facing surface;
a barrier layer comprising a hermetic barrier layer and a heat sealing layer disposed on at least a portion of the vacuum insulated panels;
an outer enclosure having a plurality of extruded support channels configured to receive the plurality of outwardly expanded framing members, an outer facing surface, at least one outwardly contoured hinge having a body portion and a reinforcing portion, an enclosure rim defining an enclosure opening, and an inner facing surface defining a receptacle for receiving the inner structure, wherein the inner facing surface of the outer enclosure engages at least a portion of the outer facing surface of the inner structure;
a liner having at least four sidewalls defining a liner opening, a back panel, a liner inner facing surface, a liner outer facing surface, and a liner perimetrical flange extending away from the liner opening, wherein the liner outer facing surface is disposed within the inner structure opening proximate the inner facing surface of the inner structure, and wherein the liner perimetrical flange is coupled to the enclosure rim, thereby defining a cabinet structure; and
at least one infrastructure notch defined by the cabinet structure proximate the liner perimetrical flange, wherein a filler member hermetically seals the infrastructure notch, and wherein a gasket is selectively disposed on at least a portion of the liner perimetrical flange.

9. The vacuum panel cabinet structure of claim 8, wherein the reinforcing portion of the at least one outwardly contoured hinge includes at least one extruded portion that extends upward through the outer enclosure and further includes a post connector, wherein the body portion defines at least one extruded hole proximate the at least one upper flared member, and wherein the post connector of each at least one upper flared member couples the at least one outwardly contoured hinge to the outer enclosure at each at least one extruded hole, and wherein the at least one outwardly contoured hinge is disposed proximate at least one of the plurality of outwardly expanded framing members, and wherein the at least one outwardly contoured hinge extends around at least one of the plurality of outwardly expanded framing members.

10. The vacuum panel cabinet structure of claim 8, wherein the outer enclosure includes a metallic back panel and a metallic bottom cover, wherein the outer enclosure includes a plurality of structural recesses.

11. The vacuum panel cabinet structure of claim 8, wherein the inner structure includes at least one conduit defined within at least one of the plurality of outwardly expanded framing members.

12. The vacuum panel cabinet structure of claim 8 further comprising:
a mullion member including a polyurethane mullion frame that defines one of the plurality of panel receptacles, wherein the polyurethane mullion frame is coupled with at least a portion of the inner facing surface of the inner structure, and wherein one of the plurality of vacuum insulated panels is sized and configured for reception in the panel receptacle of the polyurethane mullion frame;
a mullion member outer surface; and
a mullion portion of the liner outer facing surface, wherein the mullion portion is disposed to at least a portion of the mullion member outer surface, and wherein the liner inner facing surface defines at least two compartments of the vacuum panel cabinet structure.

13. The vacuum panel cabinet structure of claim 8, wherein the gasket is disposed on at least one operable panel of the vacuum insulated cabinet structure, wherein the at least one operable panel is operable between open and closed positions, and wherein when the at least one operable panel is in the closed position, the gasket is selectively engaged to at least a portion of the liner perimetrical flange thereby providing a substantially hermetic seal between the panel and the liner perimetrical flange and further sealing the infrastructure notch.

14. The vacuum panel cabinet structure of claim 8 further comprising:
a metal clad outer cabinet having an interior surface defining a receptacle configured to receive the vacuum panel cabinet structure.

15. A method for creating a vacuum panel cabinet structure comprising the steps of:
providing a polymeric inner frame having at least four side framing members defining an inner frame opening, a plurality of framing edges, a back framing member coupled to at least one of the plurality of framing edges, at least one outwardly expanded framing member disposed proximate at least one of the plurality of framing edges, an inner facing surface, and an outer facing surface, wherein the at least four side framing members and the back framing member define a plurality of panel receptacles;
providing a plurality of vacuum insulated panels configured for reception in the plurality of panel receptacles;
disposing the vacuum insulated panels within the plurality of panel receptacles;
disposing a barrier layer comprising a hermetic barrier layer and a heat sealing layer on at least a portion of the vacuum insulated panels and at least a portion of the polymeric inner frame;
providing an outer enclosure having an outer facing surface, an enclosure rim defining an enclosure opening, at least one extruded support channel configured to engage the at least one outwardly expanded framing member, and an inner facing surface defining a structure receptacle for receiving the polymeric inner frame;
disposing at least one outwardly contoured hinge onto the outer enclosure, wherein each at least one outwardly contoured hinge includes a hinge body disposed on the outer facing surface of the outer enclosure, a reinforcing portion disposed on the inner facing surface of the outer enclosure, and at least one connection member that couples the hinge body to the reinforcing portion, wherein the at least one outwardly contoured hinge is disposed proximate at least one of the at least one outwardly expanded framing member;
disposing the polymeric inner frame into the structure receptacle, wherein the inner facing surface of the outer enclosure engages at least a portion of the outer facing surface of the polymeric inner frame;
providing a liner having at least four sidewalls defining a liner opening, a back panel, a liner inner facing surface, a liner outer facing surface, and a liner perimetrical flange extending away from the liner opening;
disposing the liner within the inner structure opening such that the liner outer facing surface is disposed proximate the inner facing surface of the polymeric inner frame;
disposing the liner perimetrical flange of the liner to the enclosure rim of the outer enclosure to define a cabinet structure;
providing at least one infrastructure notch defined by the cabinet structure proximate the liner perimetrical flange, wherein a filler material is disposed within the infrastructure notch to hermetically seal the infrastructure notch; and
selectively disposing a gasket on at least a portion of the liner perimetrical flange, wherein the gasket is configured to selectively engage and further seal the infrastructure notch.

16. The method of claim 15, wherein the reinforcing portion of each of the at least one outwardly contoured hinge includes at least one upper flared member that extends upward through the outer enclosure and couples to a body portion of the respective at least one outwardly contoured hinge, wherein the reinforcing portion and the body portion define at least one extruded hole through the at least one upper flared member, and wherein the at least one connection member couples the at least one outwardly contoured hinge to the outer enclosure at the at least one extruded hole.

17. The method of claim 15, wherein the outer enclosure includes a metallic back panel and a metallic bottom cover, wherein the outer enclosure includes a plurality of structural recesses.

18. The method of claim 15, wherein the polymeric inner frame includes at least one conduit defined within at least one of the at least one outwardly expanded framing member.

19. The method of claim 15, wherein the polymeric inner frame includes a mullion frame that defines one of the plurality of panel receptacles, wherein the mullion frame is coupled with at least a portion of the inner facing surface of the polymeric inner frame, and wherein at least one of the plurality of vacuum insulated panels is sized and configured for reception in the panel receptacle of the mullion frame, and wherein the liner includes a mullion portion wherein the liner outer facing surface of the mullion portion is disposed proximate the mullion frame, and wherein the mullion portion of the liner defines at least two compartments of the vacuum panel cabinet structure.

* * * * *